(12) United States Patent
Oda et al.

(10) Patent No.: US 8,791,196 B2
(45) Date of Patent: Jul. 29, 2014

(54) ADHESIVE COMPOSITION FOR LABELS

(75) Inventors: Ryouji Oda, Tokyo (JP); Sadaharu Hashimoto, Tokyo (JP)

(73) Assignee: Zeon Corporation, Tokyo (JP)

(*) Notice: Subject to any disclaimer, the term of this patent is extended or adjusted under 35 U.S.C. 154(b) by 105 days.

(21) Appl. No.: 13/255,217

(22) PCT Filed: Mar. 29, 2010

(86) PCT No.: PCT/JP2010/055581
§ 371 (c)(1),
(2), (4) Date: Sep. 7, 2011

(87) PCT Pub. No.: WO2010/113883
PCT Pub. Date: Oct. 7, 2010

(65) Prior Publication Data
US 2011/0319549 A1    Dec. 29, 2011

(30) Foreign Application Priority Data
Mar. 31, 2009  (JP) .................. 2009-088574

(51) Int. Cl.
C08L 53/02    (2006.01)
C09J 153/02   (2006.01)

(52) U.S. Cl.
CPC ............ *C09J 153/02* (2013.01); *C08L 2205/03* (2013.01); *C08L 53/02* (2013.01); *C08L 2205/02* (2013.01)
USPC .......................................... 524/505; 525/89

(58) Field of Classification Search
CPC ............... C09J 153/02; C08L 2666/24; C08L 2205/02; C08L 2205/03; C08L 53/02
USPC ................... 524/505; 525/333.3, 95, 89, 314
See application file for complete search history.

(56) References Cited

U.S. PATENT DOCUMENTS

| | | | |
|---|---|---|---|
| 4,104,327 A | 8/1978 | Inoue et al. | |
| 4,335,221 A | 6/1982 | Gerberding | |
| 4,386,125 A | 5/1983 | Shiraki et al. | |
| 4,699,938 A | 10/1987 | Minamizaki et al. | |
| 4,939,207 A | 7/1990 | Fasulo et al. | |
| 5,290,842 A | 3/1994 | Sasaki et al. | |
| 5,723,222 A | 3/1998 | Sato et al. | |
| 6,291,583 B1* | 9/2001 | Komatsuzaki et al. | 525/95 |
| 6,329,459 B1 | 12/2001 | Kang et al. | |
| 6,344,518 B1 | 2/2002 | Kobayashi et al. | |
| 6,531,263 B2 | 3/2003 | Knoll | |
| 6,593,430 B1 | 7/2003 | Knoll et al. | |
| 7,318,985 B2 | 1/2008 | Tsubaki et al. | |
| 2004/0242775 A1 | 12/2004 | Tahara et al. | |
| 2005/0009990 A1 | 1/2005 | Knoll et al. | |
| 2005/0203198 A1 | 9/2005 | Branch et al. | |
| 2005/0233249 A1 | 10/2005 | Muldermans et al. | |
| 2006/0043629 A1 | 3/2006 | Drzal et al. | |
| 2006/0099373 A1 | 5/2006 | Dupont et al. | |
| 2006/0205874 A1 | 9/2006 | Uzee et al. | |
| 2006/0205877 A1 | 9/2006 | DuBois | |
| 2006/0235165 A1* | 10/2006 | Kawanabe et al. | 525/333.3 |
| 2008/0318161 A1 | 12/2008 | Nakano et al. | |
| 2009/0264591 A1 | 10/2009 | Sano et al. | |
| 2011/0046307 A1* | 2/2011 | Takeshi et al. | 525/89 |
| 2011/0256195 A1 | 10/2011 | Heinemann et al. | |
| 2011/0257336 A1* | 10/2011 | Oda et al. | 525/89 |
| 2011/0257337 A1* | 10/2011 | Oda et al. | 525/98 |
| 2011/0308412 A1* | 12/2011 | Matsubara et al. | 101/395 |
| 2011/0318987 A1* | 12/2011 | Ooishi et al. | 442/394 |
| 2012/0088423 A1* | 4/2012 | Oda et al. | 442/381 |

FOREIGN PATENT DOCUMENTS

| | | |
|---|---|---|
| CN | 102264854 A | 11/2011 |
| EP | 1 775 332 A1 | 4/2007 |
| EP | 1625178 B1 | 7/2007 |
| GB | 1395822 A | 5/1975 |
| JP | 51-125135 A | 11/1976 |
| JP | 56-59230 A | 5/1981 |
| JP | 57-178722 A | 11/1982 |
| JP | 59-187048 A | 10/1984 |
| JP | 61-231070 A | 10/1986 |

(Continued)

OTHER PUBLICATIONS

Extended European Search Report for European Application No. 10746236.8, dated Jun. 22, 2012.

(Continued)

*Primary Examiner* — Mark Eashoo
*Assistant Examiner* — Marilou Lacap
(74) *Attorney, Agent, or Firm* — Birch, Stewart, Kolasch & Birch, LLP

(57) ABSTRACT

Provided is an adhesive composition for labels, which can be easily applied at a relatively low temperature and has satisfactory die cutting properties so that the adhesive composition can contribute to an improvement of the productivity of labels, and which is capable of producing labels having excellent holding power and tackiness. There is disclosed an adhesive composition for labels comprising: a block copolymer A represented by the following general formula (A); a polymer C, which is a polymer having a glass transition temperature of $-30°$ C. or lower, or a block copolymer that has a polymer block having a glass transition temperature of $-30°$ C. or lower at an end of the polymer chain; and a tackifier resin D.

$$Ar1^{a}\text{-}D^{a}\text{-}Ar2^{a} \tag{A}$$

in the general formula (A), $Ar1^{a}$ represents an aromatic vinyl polymer block having a weight average molecular weight of 6,000 to 20,000; $Ar2^{a}$ represents an aromatic vinyl polymer block having a weight average molecular weight of 22,000 to 400,000; and $D^{a}$ represents a conjugated diene polymer block having a vinyl bond content of 1 mol % to 20 mol %.

16 Claims, No Drawings

(56) References Cited

FOREIGN PATENT DOCUMENTS

| | | |
|---|---|---|
| JP | 63-66277 A | 3/1988 |
| JP | 63-179956 A | 7/1988 |
| JP | 64-65152 A | 3/1989 |
| JP | 64-79251 A | 3/1989 |
| JP | 2-222440 A | 9/1990 |
| JP | 5-93176 A | 4/1993 |
| JP | 5-263056 A | 10/1993 |
| JP | 5-287084 A | 11/1993 |
| JP | 8-60121 A | 3/1996 |
| JP | 8-283685 A | 10/1996 |
| JP | 9-66554 A | 3/1997 |
| JP | 9-78048 A | 3/1997 |
| JP | 11-12430 A | 1/1999 |
| JP | 2000-155418 A | 6/2000 |
| JP | 2000-204129 A | 7/2000 |
| JP | 2001-504519 A | 4/2001 |
| JP | 2001-520244 A | 10/2001 |
| JP | 2002-60583 A | 2/2002 |
| JP | 2002-72457 A | 3/2002 |
| JP | 2002-519465 A | 7/2002 |
| JP | 2003-73434 A | 3/2003 |
| JP | 2003-261740 A | 9/2003 |
| JP | 2004-107519 A | 4/2004 |
| JP | 2004-238548 A | 8/2004 |
| JP | 2004-331707 A | 11/2004 |
| JP | 2005-510612 A | 4/2005 |
| JP | 2005-232246 A | 9/2005 |
| JP | 2006-89546 A | 4/2006 |
| JP | 2006-514338 A | 4/2006 |
| JP | 2006-241177 A | 9/2006 |
| JP | 2006-520826 A | 9/2006 |
| JP | 2006-274158 A | 10/2006 |
| JP | 2006-282683 A | 10/2006 |
| JP | 2006-528273 A | 12/2006 |
| JP | 2007-230180 A | 9/2007 |
| JP | 2008-7654 A | 1/2008 |
| JP | 2008-533230 A | 8/2008 |
| WO | WO 97/30844 A1 | 8/1997 |
| WO | WO 99/19388 A1 | 4/1999 |
| WO | WO 00/00546 A1 | 1/2000 |
| WO | WO 03/020825 A1 | 3/2003 |
| WO | WO 2004/074392 A1 | 9/2004 |
| WO | WO 2004/076556 A1 | 9/2004 |
| WO | WO 2004/104095 A1 | 12/2004 |
| WO | WO 2005/031459 A1 | 4/2005 |
| WO | WO 2006/051863 A1 | 5/2006 |
| WO | WO 2007/072613 A1 | 6/2007 |
| WO | WO 2009/123089 * | 10/2009 |
| WO | WO 2009/123089 A1 | 10/2009 |

OTHER PUBLICATIONS

International Search Report for International Application No. PCT/JP2009/056449, dated Jun. 9, 2009.
International Search Report for International Application No. PCT/JP2009/071684, dated Feb. 2, 2010.
International Search Report for International Application No. PCT/JP2009/071692, dated Feb. 23, 2010.
International Search Report for International Application No. PCT/JP2010/052879, dated Mar. 23, 2010.
International Search Report for International Application No. PCT/JP2010/055580, dated Jun. 15, 2010.
International Search Report for International Application No. PCT/JP2010/060760, dated Aug. 10, 2010.
US Office Action for U.S. Appl. No. 12/935,361, dated Aug. 31, 2012.
US Office Action for U.S. Appl. No. 13/141,950, dated Sep. 11, 2012.
US Office Action for U.S. Appl. No. 13/142,065, dated Sep. 7, 2012.
US Office Action for U.S. Appl. No. 13/255,354, dated Aug. 31, 2012.
US Office Action, dated Feb. 19, 2013, for Copending U.S. Appl. No. 13/138,493.
International Search Report, dated Jun. 29, 2010, issued in PCT/JP2010/055581.
European Search Report issued in European Application No. 10758654.7 on Jun. 5, 2013.
Notice of Allowance issued in U.S. Appl. No. 13/142,065 on Apr. 5, 2013.
Notice of Allowance for U.S. Appl. No. 13/255,354, dated Mar. 18, 2013.
Office Action for U.S. Appl. No. 13/141,950, dated Mar. 21, 2013.
U.S. Office Action in U.S. Appl. No. 13/377,990 dated Jul. 31, 2013.
Notice of Allowance, dated Jan. 8, 2014, for U.S. Appl. No. 13/377,990.

* cited by examiner

ADHESIVE COMPOSITION FOR LABELS

TECHNICAL FIELD

The present invention relates to an adhesive composition for labels, and more particularly, to an adhesive composition for labels, which can be easily applied at a relatively low temperature in the production of labels and has satisfactory die cutting properties so that the adhesive composition can contribute to an improvement of the productivity of labels, and which is capable of producing labels having excellent holding power and tackiness.

BACKGROUND ART

In the event of industrially manufacturing labels, a production method in which a hot melt adhesive is melted, the molten hot melt adhesive is applied on a substrate such as a releasing paper by a coating apparatus such as a die coater, and an adhesive sheet thus obtained is processed into products having a constant size by cutting the adhesive sheet using a die cutter, is usually employed.

In this production method, the productivity of labels depends largely on the properties of the hot melt adhesive used, and particularly, the effect of the application temperature and die cutting properties (ease of cutting to a constant size without threading or adhering to the die when the adhesive is cut with a die cutter) of the hot melt adhesive on the productivity of labels has grown extremely large.

Accordingly, investigations have been conducted on hot melt adhesives that are used in the manufacture of labels, so as to improve the die cutting properties, to lower the appliable temperature, and the like. For example, Patent Literature 1 describes that when a tackifier resin is incorporated into two kinds of elastomers respectively having a particular relationship between glass transition temperatures and tan δ values in the measurement of dynamic viscoelasticity, a pressure sensitive adhesive having excellent die cutting properties and excellent adhesive performance is obtained. Furthermore, Patent Literature 2 discloses a pressure sensitive adhesive prepared by mixing a styrene-isoprene-styrene block copolymer with a tackifier and a styrene-isoprene block copolymer. In this pressure sensitive adhesive, the incorporation of the styrene-isoprene block copolymer contributes to an increase in the tan δ value at 20° C. of the pressure sensitive adhesive, and as a result, the die cutting properties are enhanced. Furthermore, the adhesive performance such as adhesive strength or the heat resistance of adhesion is also improved.

However, it has been difficult to say that even such hot melt adhesives have a satisfactory balance between the ease of coating at a relatively low temperature and the die cutting properties. Therefore, there has been a demand for a hot melt adhesive for labels which can achieve a high-level balance between the ease of coating at a relatively low temperature and the die cutting properties.

CITATION LIST

Patent Literature

Patent Literature 1: U.S. Pat. No. 5,290,842
Patent Literature 2: Japanese Translation of International Patent Application No. 2001-504519

SUMMARY OF INVENTION

Technical Problem

An object of the present invention is to provide an adhesive composition for labels, which can be easily applied at a relatively low temperature and has satisfactory die cutting properties so that the adhesive composition can contribute to an improvement of the productivity of labels, and which is capable of producing labels having excellent holding power and tackiness.

Solution to Problem

The inventors of the present invention conducted a thorough investigation in order to achieve the object described above, and as a result, they found that an adhesive composition which is obtained by incorporating a polymer such as (styrene polymer block)-[(styrene-butadiene) random copolymer block] diblock copolymer, polyisoprene, or the like, into an asymmetric aromatic vinyl-conjugated diene-aromatic vinyl block copolymer in which two aromatic vinyl polymer blocks have specific weight average molecular weights that are different from each other, and further incorporating a tackifier resin, has a low melt viscosity at a relatively low temperature, and has a large tan δ value at 20° C. The inventors also found that when this adhesive composition is used as an adhesive composition for labels, application at a relatively low temperature is easy, and satisfactory die cutting properties are obtained, so that the adhesive composition contributes to an enhancement of the productivity of labels. The inventors further found that the labels thus obtained are excellent in holding power and tackiness. Thus, the present invention was completed based on this finding.

Thus, according to the present invention, there is provided an adhesive composition for labels comprising: a block copolymer A represented by the following general formula (A); a polymer C, which is a polymer having a glass transition temperature of −30° C. or lower, or a block copolymer that has a polymer block having a glass transition temperature of −30° C. or lower at an end of the polymer chain; and a tackifier resin D.

$$Ar1^a\text{-}D^a\text{-}Ar2^a \quad (A)$$

In the general formula (A), $Ar1^a$ represents an aromatic vinyl polymer block having a weight average molecular weight of 6,000 to 20,000; $Ar2^a$ represents an aromatic vinyl polymer block having a weight average molecular weight of 22,000 to 400,000; and $D^a$ represents a conjugated diene polymer block having a vinyl bond content of 1 mol % to 20 mol %.

In the adhesive composition for labels, the polymer C is preferably a conjugated diene polymer having a glass transition temperature of −30° C. or lower, or a block copolymer that has a conjugated diene polymer block having a glass transition temperature of −30° C. or lower at an end of a polymer chain.

The adhesive composition for labels preferably comprises, as the polymer C, at least one kind of isoprene unit-containing polymer selected from a conjugated diene polymer containing an isoprene unit, and a block copolymer that has a conjugated diene polymer block containing an isoprene unit, at an end of a polymer chain. Furthermore, the adhesive composition for labels preferably comprises a block copolymer C1 represented by the following general formula (C1) as the isoprene unit-containing polymer:

$$Ar^c\text{-}PI \quad (C1),$$

in the general formula (C1), $Ar^c$ represents an aromatic vinyl polymer block having a weight average molecular weight of 6,000 to 20,000; and PI represents an isoprene polymer block having a vinyl bond content of 1 mol % to 20 mol %.

The adhesive composition for labels preferably comprises, as the polymer C, at least one kind of butadiene unit-containing polymer selected from a conjugated diene polymer containing a 1,3-butadiene unit, and a block copolymer that has a conjugated diene polymer block containing a 1,3-butadiene unit, at an end of a polymer chain.

The adhesive composition for labels preferably comprises, as the polymer C, both of:

(1) at least one kind of isoprene unit-containing polymer selected from a conjugated diene polymer containing an isoprene unit, and a block copolymer that has a conjugated diene polymer block containing an isoprene unit, at an end of a polymer chain; and (2) at least one kind of butadiene unit-containing polymer selected from a conjugated diene polymer containing a 1,3-butadiene unit, and a block copolymer that has a conjugated diene polymer block containing a 1,3-butadiene unit, at an end of a polymer chain. Furthermore, the adhesive composition for labels preferably comprises a block copolymer C1 represented by the following general formula (C1) as the isoprene unit-containing polymer. Furthermore, a weight ratio of the isoprene unit-containing polymer and the butadiene unit-containing polymer is preferably 10/90 to 90/10.

In the adhesive composition for labels, a weight ratio (A/C) of the block copolymer A and the polymer C is preferably 5/95 to 95/5.

The adhesive composition for labels preferably further comprises a block copolymer B represented by the following general formula (B):

in the general formula (B), $Ar^b$ represents an aromatic vinyl polymer block having a weight average molecular weight of 6,000 to 20,000; $D^b$ represents a conjugated diene polymer block having a vinyl bond content of 1 mol % to 20 mol %; X represents a single bond or a residue of a coupling agent; and n represents an integer of 2 or greater.

In the adhesive composition for labels, a proportion occupied by an aromatic vinyl monomer unit relative to a total amount of polymer components consisting of the block copolymer A, the block copolymer B which is a component that is optionally contained, and the polymer C, is preferably 13% to 80% by weight.

The adhesive composition for labels described above is preferably such that the content of the tackifier resin D is 10 to 500 parts by weight relative to 100 parts by weight of the polymer components consisting of the block copolymer A, the block copolymer B which is a component that is optionally contained, and the polymer C.

The adhesive composition for labels preferably further comprises a softening agent.

Advantageous Effects of Invention

According to the present invention, there is obtained an adhesive composition for labels which can be easily applied at a relatively low temperature and has satisfactory die cutting properties so that the adhesive composition can contribute to an improvement of the productivity of labels, and which is capable of producing labels having excellent holding power and tackiness.

DESCRIPTION OF EMBODIMENTS

The adhesive composition of the present invention is a composition which is used as an adhesive for labels and comprises at least a block copolymer A, a polymer C, and a tackifier resin D. The block copolymer A of the present invention is an aromatic vinyl-conjugated diene-aromatic vinyl block copolymer represented by the following general formula (A), in which two aromatic vinyl polymer blocks have weight average molecular weights that are different from each other.

In the general formula (A), $Ar1^a$ represents an aromatic vinyl polymer block having a weight average molecular weight of 6,000 to 20,000; $Ar2^a$ represents an aromatic vinyl polymer block having a weight average molecular weight of 22,000 to 400,000; and $D^a$ represents a conjugated diene polymer block having a vinyl bond content of 1 mol % to 20 mol %.

The adhesive composition for labels of the present invention may further comprise, in addition to the block copolymer A, a block copolymer B which is an aromatic vinyl-conjugated diene-aromatic vinyl block copolymer represented by the following general formula (B).

In the general formula (B), $Ar^b$ represents an aromatic vinyl polymer block having a weight average molecular weight of 6,000 to 20,000; $D^b$ represents a conjugated diene polymer block having a vinyl bond content of 1 mol % to 20 mol %; X represents a single bond or a residue of a coupling agent; and n represents an integer of 2 or greater.

The aromatic vinyl polymer blocks ($Ar1^a$, $Ar2^a$ and $Ar^b$) of the block copolymer A and the block copolymer B are polymer blocks each constituted of an aromatic vinyl monomer unit. There are no particular limitations on the aromatic vinyl monomer that may be used to constitute the aromatic vinyl monomer units of the aromatic vinyl polymer blocks as long as the aromatic vinyl monomer is an aromatic vinyl compound. Examples include styrene, α-methylstyrene, 2-methylstyrene, 3-methylstyrene, 4-methylstyrene, 2-ethylstyrene, 3-ethylstyrene, 4-ethylstyrene, 2,4-diisopropylstyrene, 2,4-dimethylstyrene, 4-t-butylstyrene, 5-t-butyl-2-methylstyrene, 2-chlorostyrene, 3-chlorostyrene, 4-chlorostyrene, 4-bromostyrene, 2-methyl-4,6-dichlorostyrene, 2,4-dibromostyrene, and vinylnaphthalene. Among these, it is preferable to use styrene. These aromatic vinyl monomers can be used singly or in combination of two or more kinds, in the respective aromatic vinyl polymer blocks. Furthermore, for the respective aromatic vinyl polymer blocks, an identical aromatic vinyl monomer may be used throughout the block, or different aromatic vinyl monomers may be used.

The aromatic vinyl polymer blocks ($Ar1^a$, $Ar2^a$ and $Ar^b$) of the block copolymer A and the block copolymer B may respectively contain a monomer unit other than the aromatic vinyl monomer unit. Examples of a monomer that constitutes the monomer unit other than the aromatic vinyl monomer unit, which can be contained in the aromatic vinyl polymer blocks, include a conjugated diene monomer such as 1,3-butadiene and isoprene (2-methyl-1,3-butadiene), an α,β-unsaturated nitrile monomer, an unsaturated carboxylic acid or acid anhydride monomer, an unsaturated carboxylic acid ester monomer, and a non-conjugated diene monomer. The content of the monomer unit other than the aromatic vinyl monomer unit in the respective aromatic vinyl polymer blocks is preferably 20% by weight or less, and more preferably 10% by weight or less, and it is particularly preferable that the content be substantially 0% by weight.

The conjugated diene polymer blocks ($D^a$ and $D^b$) of the block copolymer A and the block copolymer B are polymer blocks each constituted of a conjugated diene monomer unit.

There are no particular limitations on the conjugated diene monomer that may be used to constitute the conjugated diene monomer units of the conjugated diene polymer blocks as long as the conjugated diene monomer is a conjugated diene compound. Examples include 1,3-butadiene, isoprene, 2,3-dimethyl-1,3-butadiene, 2-chloro-1,3-butadiene, 1,3-pentadiene, and 1,3-hexadiene. Among these, it is preferable to use 1,3-butadiene and/or isoprene, and it is particularly preferable to use isoprene. When the conjugated diene polymer blocks are constituted of an isoprene unit, an adhesive composition for labels having excellent adhesiveness and flexibility can be obtained. These conjugated diene monomers can be used singly or in combination of two or more kinds, in the respective conjugated diene polymer blocks. Furthermore, for the respective conjugated diene polymer blocks, an identical conjugated diene monomer may be used throughout the block, or different conjugated dienemonomers may be used. In addition, a portion of the unsaturated bonds in the respective conjugated diene polymer blocks may be subjected to a hydrogenation reaction.

The conjugated diene polymer blocks ($D^a$ and $D^b$) of the block copolymer A and the block copolymer B may respectively contain a monomer unit other than the conjugated diene monomer unit. Examples of a monomer that constitutes the monomer unit other than the conjugated diene monomer unit, which can be contained in the conjugated diene polymer blocks, include an aromatic vinyl monomer such as styrene and α-methylstyrene, an α,β-unsaturated nitrile monomer, an unsaturated carboxylic acid or acid anhydride monomer, an unsaturated carboxylic acid ester monomer, and a non-conjugated diene monomer. The content of the monomer unit other than the conjugated diene monomer unit in the respective conjugated diene polymer blocks is preferably 20% by weight or less, and more preferably 10% by weight or less, and it is particularly preferable that the content be substantially 0% by weight.

The block copolymer A that constitutes the adhesive composition for labels of the present invention is an asymmetric aromatic vinyl-conjugated diene-aromatic vinyl block copolymer composed of an aromatic vinyl polymer block ($Ar1^a$) having a relatively small weight average molecular weight, a conjugated diene polymer block ($D^a$) having a specific vinyl bond content, and an aromatic vinyl polymer block ($Ar2^a$) having a relatively large weight average molecular weight, linked in this order, as represented by the general formula (A). The weight average molecular weight (Mw($Ar1^a$)) of the aromatic vinyl polymer block ($Ar1^a$) having a relatively small weight average molecular weight is 6,000 to 20,000, preferably 7,000 to 18,000, and more preferably 8,000 to 16,000. If the value of Mw($Ar1^a$) is too small, there is a risk that the resulting adhesive composition for labels may have low holding power. If the value of Mw($Ar1^a$) is too large, there is a risk that the melt viscosity of the adhesive composition for labels may become markedly high. Furthermore, the weight average molecular weight (Mw($Ar2^a$)) of the aromatic vinyl polymer block ($Ar2^a$) having a relatively large weight average molecular weight is 22,000 to 400,000, preferably 25,000 to 370,000, and more preferably 30,000 to 350,000. If the value of Mw($Ar2^a$) is too small, there is a risk that the resulting adhesive composition for labels may have low holding power and a high melt viscosity at a relatively low temperature. A block copolymer A having an excessively large value of Mw($Ar2^a$) may be difficult to produce.

In the present invention, the weight average molecular weight of a polymer or a polymer block is a value determined by an analysis by high performance liquid chromatography, relative to polystyrene standards.

In the block copolymer A, there are no particular limitations on the ratio (Mw($Ar2^a$)/Mw($Ar1^a$)) of the weight average molecular weight (Mw($Ar2^a$)) of the aromatic vinyl polymer block ($Ar2^a$) having a relatively large weight average molecular weight and the weight average molecular weight (Mw($Ar1^a$)) of the aromatic vinyl polymer block ($Ar1^a$) having a relatively small weight average molecular weight, but the ratio is usually 1.5 to 67, preferably 2 to 40, and more preferably 3 to 35. When the block copolymer A is constructed to have such a constitution, the resulting adhesive composition for labels may have a low melt viscosity at a relatively low temperature and excellent appliability.

The vinyl bond content of the conjugated diene polymer block ($D^a$) of the block copolymer A (the proportion occupied by 1,2-vinyl bonds and 3,4-vinyl bonds in all the conjugated diene monomer units) is 1 mol % to 20 mol %, preferably 2 mol % to 15 mol %, and more preferably 3 mol % to 10 mol %. If this vinyl bond content is too large, there is a risk that the resulting adhesive composition for labels may become excessively hard and have a poor adhesive force.

The weight average molecular weight (Mw($D^a$)) of the conjugated diene polymer block ($D^a$) of the block copolymer A is not particularly limited, but is usually 20,000 to 200,000, preferably 30,000 to 150,000, and more preferably 35,000 to 100,000.

There are no particular limitations on the content of the aromatic vinyl monomer units relative to the total amount of the monomer units of the block copolymer A. However, the content is preferably 35% by weight or greater, more preferably 41% by weight or greater, even more preferably 45% to 87% by weight, and most preferably 50% to 85% by weight. When the content of the aromatic vinyl monomer units relative to the total amount of the monomer units of the block copolymer A falls in this range, the resulting adhesive composition for labels may have excellent holding power.

There are no particular limitations on the overall weight average molecular weight of the block copolymer A, but the weight average molecular weight is usually 70,000 to 500,000, preferably 80,000 to 470,000, and more preferably 90,000 to 450,000.

The block copolymer B that can be contained in the adhesive composition for labels of the present invention is a block copolymer in which two or more of diblock forms ($Ar^b$-$D^b$), each of which is composed of an aromatic vinyl polymer block ($Ar^b$) having a specific weight average molecular weight that is linked to a conjugated diene polymer block ($D^b$) having a specific vinyl bond content, are linked directly by a single bond or via a coupling agent residue, as represented by the general formula (B). The weight average molecular weight (Mw($Ar^b$)) of the aromatic vinyl polymer block ($Ar^b$) that constitutes the block copolymer B is 6,000 to 20,000, preferably 7,000 to 18,000, and more preferably 8,000 to 16,000. If the weight average molecular weights (Mw($Ar^b$)) of the plural aromatic vinyl polymer blocks that are present in the block copolymer B fall in the range described above, the weight average molecular weights may be identical with or different from one another; however, it is preferable that the weight average molecular weights be substantially identical. Furthermore, it is more preferable that the weight average molecular weight (Mw($Ar^b$)) of these aromatic vinyl polymer blocks be substantially identical with the weight average molecular weight (Mw($Ar1^a$)) of the aromatic vinyl polymer block ($Ar1^a$) having a relatively small weight average molecular weight of the block copolymer A.

The vinyl bond content of the conjugated diene polymer block ($D^b$) of the block copolymer B is 1 mol % to 20 mol %, preferably 2 mol % to 15 mol %, and more preferably 3 mol % to 10 mol %. It is preferable that the vinyl bond content of the conjugated diene polymer block ($D^b$) of the block copolymer B be substantially equal to the vinyl bond content of the conjugated diene polymer block ($D^a$) of the block copolymer A.

The block copolymer B is a block copolymer in which diblock forms ($Ar^b$-$D^b$), each of which is composed of an aromatic vinyl polymer block ($Ar^b$) linked to a conjugated diene polymer block ($D^b$), are linked directly by a single bond or via a residue of a coupling agent. Examples of the coupling agent that constitutes the residue of the coupling agent include the compounds that will be described below. The number of the diblock forms ($Ar^b$-$D^b$) that are linked together (that is, n in the general formula (B)) is not particularly limited as long as the number is 2 or greater, and block copolymers B in which different numbers of the diblock forms are linked may be present in mixture. There are no particular limitations on the number n in the general formula (B) as long as the number is an integer of 2 or greater, but the number is usually an integer from 2 to 8, and preferably an integer from 2 to 4.

There are no particular limitations on the weight average molecular weight (Mw($D^b$)) of the conjugated diene polymer block ($D^b$) of the block copolymer B, but the weight average molecular weight is usually 20,000 to 200,000, preferably 30,000 to 150,000, and more preferably 35,000 to 100,000. Furthermore, it is preferable that the weight average molecular weight (Mw($D^b$)) of the conjugated diene polymer block ($D^b$) of the block copolymer B be substantially identical with the weight average molecular weight (Mw($D^a$)) of the conjugated diene polymer block ($D^a$) of the block copolymer A. In addition, when an aromatic vinyl-conjugated diene-aromatic vinyl block copolymer produced without using a coupling agent is used as a block copolymer B, the conjugated diene polymer blocks contained in the block copolymer has all the monomer units directly linked together, and in reality, it cannot be said that this block copolymer is composed of two conjugated diene polymer blocks ($D^b$). However, in the present invention, even in the case of such conjugated diene polymer blocks, the block copolymer is conceptually regarded as a product in which two conjugated diene polymer blocks ($D^b$) having substantially identical weight average molecular weights are linked by a single bond. Therefore, for example, in the case of a block copolymer B which is an aromatic vinyl-conjugated diene-aromatic vinyl block copolymer produced without using a coupling agent, when the conjugated diene polymer block has an overall weight average molecular weight of 100,000, the block copolymer is considered to have a Mw($D^b$) of 50,000.

There are no particular limitations on the content of the aromatic vinyl monomer unit relative to the total amount of the monomer units of the block copolymer B, but the content is usually 10% to 35% by weight, preferably 12% to 32% by weight, and more preferably 15% to 30% by weight. Also, there are no particular limitations on the overall weight average molecular weight of the block copolymer B, but the overall weight average molecular weight is usually 50,000 to 400,000, preferably 60,000 to 350,000, and more preferably 70,000 to 300,000.

There are no particular limitations on the molecular weight distribution, which is expressed as the ratio (Mw/Mn) of the weight average molecular weight (Mw) and the number average molecular weight (Mn), of the respective polymer blocks constituting the block copolymer A and the block copolymer B, but the molecular weight distribution is usually 1.1 or less, and preferably 1.05 or less.

The weight ratio (A/B) of the block copolymer A and the block copolymer B that can be contained in the adhesive composition for labels of the present invention is preferably 10/90 to 100/0, more preferably 25/75 to 85/15, and even more preferably 36/64 to 80/20. When the respective block copolymers are contained at these ratios, the resulting adhesive composition for labels is made to have a low melt viscosity at a relatively low temperature and excellent appliability. Furthermore, the adhesive composition is made to have high holding power after adhesion. On the other hand, if this ratio of A is too small, there is a risk that the adhesive composition for labels may have a high melt viscosity at a low temperature.

The adhesive composition for labels further comprises a polymer C which is a polymer having a glass transition temperature of −30° C. or lower, or a block copolymer that has a polymer block having a glass transition temperature of −30° C. or lower at an end of the polymer chain. When such a polymer C is incorporated, the adhesive composition for labels of the present invention acquires an excellent adhesive force and excellent die cutting properties.

The polymer having a glass transition temperature of −30° C. or lower, which can be used as the polymer C, is a polymer having a substantially single glass transition temperature, and is a polymer having a glass transition temperature of −30° C. or lower, and preferably −90° C. to −35° C.

Examples of the polymer having a substantially single glass transition temperature that can serve as the polymer C include a conjugated diene polymer, a butene-based polymer, an isobutylene-based polymer, an acrylic polymer, an ester-based polymer, an ether-based polymer, and a urethane-based polymer. Among these, a conjugated diene polymer composed of a conjugated diene monomer unit is used with preference. Examples of the conjugated diene monomer used to constitute the conjugated diene monomer unit of this conjugated diene polymer include those conjugated diene compounds that can be used to construct the polymer block of the block copolymer A described above. Among them, it is preferable to use 1,3-butadiene and/or isoprene, from the viewpoint that these compounds exhibit appropriate compatibility with the polymer A components and are excellent in adhesiveness, transparency and storage stability.

The conjugated diene polymer that can be used as the polymer C may contain a monomer unit other than the conjugated diene monomer unit, as long as the glass transition temperature is −30° C. or lower. Examples of a monomer that constitutes the monomer unit other than the conjugated diene monomer unit that can be contained in the conjugated diene polymer, include an aromatic vinyl monomer such as styrene and α-methylstyrene, an α,β-unsaturated nitrile monomer, an unsaturated carboxylic acid or acid anhydride monomer, an unsaturated carboxylic acid ester monomer, and a non-conjugated diene monomer. The content of the monomer unit other than the conjugated diene monomer unit in the conjugated diene polymer is preferably 50% by weight or less, and more preferably 45% by weight or less, and it is particularly preferable that the content be substantially 0% by weight.

There are no particular limitations on the vinyl bond content of the conjugated diene polymer that can be used as the polymer C (the proportion occupied by 1,2-vinyl bonds and 3,4-vinyl bonds in all the conjugated diene monomer units). However, the content is preferably 1 mol % to 60 mol %, and more preferably 2 mol % to 50 mol %. If this vinyl bond content is too large, there is a risk that the glass transition temperature of the adhesive composition may increase, and the adhesive composition may have poor tackiness.

There are no particular limitations on the weight average molecular weight (Mw) of the polymer having a substantially single glass transition temperature that can be used as the polymer C, but the weight average molecular weight is usually 500 or greater, preferably 500 to 500,000, and more preferably 1500 to 300,000. If this value is too small, there is a risk that the die cutting properties may be deteriorated due to the effect of high compatibility, and if this value is too large, there is a risk that processability may be deteriorated. The molecular weight distribution, which is expressed as the ratio (Mw/Mn) of the weight average molecular weight (Mw) and the number average molecular weight (Mn), of this polymer is also not particularly limited, but the molecular weight distribution is usually 3 or less, and preferably 2 or less.

In the adhesive composition for labels of the present invention, the block copolymer that has a polymer block having a glass transition temperature of −30° C. or lower at an end of the polymer chain, is a block copolymer composed of at least two different polymer blocks, in which among those polymer blocks, at least one polymer block between the polymer blocks positioned at the ends of the polymer chain has a glass transition temperature of −30° C. or lower, and preferably −90° C. to −35° C.

Examples of the polymer block having a glass transition temperature of −30° C. or lower, which is positioned at an end of the block copolymer that can be used as the polymer C, include a conjugated diene polymer block, an ethylene-butene polymer block, an ethylene-propylene polymer block, an isobutylene-based polymer block, an acrylic polymer block, an ester-based polymer block, an ether-based polymer block, and a urethane-based polymer block. Among these, a conjugated diene polymer block composed of a conjugated diene monomer unit is used with preference. Examples of a conjugated diene monomer that is used to constitute the conjugated diene monomer unit of this conjugated diene polymer include those conjugated diene compounds that can be used to construct the polymer block of the block copolymer A described above. Among them, it is preferable to use 1,3-butadiene and/or isoprene, from the viewpoint that these compounds exhibit appropriate compatibility with the polymer A components and are excellent in adhesiveness, transparency and storage stability.

The conjugated diene polymer block positioned at an end of the block copolymer that can be used as the polymer C, may contain a monomer unit other than the conjugated diene monomer unit as long as the glass transition temperature of the polymer block is −30° C. or lower. Examples of a monomer that constitutes the monomer unit other than the conjugated diene monomer unit that can be contained in the conjugated diene polymer block, include an aromatic vinyl monomer such as styrene and α-methylstyrene, an α,β-unsaturated nitrile monomer, an unsaturated carboxylic acid or acid anhydride monomer, an unsaturated carboxylic acid ester monomer, and a non-conjugated diene monomer. The content of the monomer unit other than the conjugated diene monomer unit in the conjugated diene polymer is preferably 20% by weight or less, and more preferably 10% by weight or less, and it is particularly preferable that the content be substantially 0% by weight.

There are no particular limitations on the vinyl bond content of the conjugated diene polymer block positioned at an end of the block copolymer that can be used as the polymer C (the proportion occupied by 1,2-vinyl bonds and 3,4-vinyl bonds in all the conjugated diene monomer units), but the content is preferably 1 mol % to 60 mol %, and more preferably 2 mol % to 50 mol %. If this vinyl bond content is too large, there is a risk that the glass transition temperature of the adhesive composition may increase, and the adhesive composition may have poor tackiness.

There are no particular limitations on the number of the polymer blocks constituting the block copolymer that can be used as the polymer C as long as the number is 2 or greater, but the number is preferably 2 to 20, and more preferably 2 to 10. Furthermore, this block copolymer can have any polymer block as the other polymer block, as long as at least one polymer block between the polymer blocks positioned at the ends of the polymer chain has a glass transition temperature of −30° C. or lower.

There are no particular limitations on the weight average molecular weight (Mw) of the polymer block having a glass transition temperature of −30° C. or lower, which is positioned at an end of the block copolymer that can be used as the polymer C, but the weight average molecular weight is usually 500 or greater, preferably 500 to 500,000, and more preferably 1500 to 300,000. Furthermore, there are also no particular limitations on the overall weight average molecular weight (Mw) of this block copolymer, but the weight average molecular weight is usually 2,000 or greater, preferably 5,000 to 500,000, and more preferably 7,000 to 300,000. If this value is too small, there is a risk that the die cutting properties may be deteriorated due to the effect of high compatibility, and if this value is too large, there is a risk that processability may be deteriorated. In addition, there are no particular limitations also on the molecular weight distribution, which is expressed as the ratio (Mw/Mn) of the weight average molecular weight (Mw) and the number average molecular weight (Mn), of these polymer blocks or the entire block copolymer, and the molecular weight distributions are respectively usually 3 or less, and preferably 2 or less.

Examples of the polymer that is used with preference as the polymer C in the adhesive composition for labels of the present invention include conjugated diene polymers containing a 1,3-butadiene unit and block copolymers which have a conjugated diene polymer block containing a 1,3-butadiene unit at an end of the polymer chain, such as polybutadiene, a (styrene-butadiene) random copolymer, a styrene-butadiene diblock copolymer, a (styrene polymer block)-[(styrene-butadiene) random copolymer block] diblock copolymer, a [(styrene-butadiene) random copolymer block]-(butadiene polymer block) diblock copolymer, and a [(styrene-butadiene) random copolymer block]-[(styrene-butadiene) random copolymer block] diblock copolymer; and conjugated diene polymers containing an isoprene unit and block copolymers which have a conjugated diene polymer block containing an isoprene unit at an end of the polymer chain, such as polyisoprene, a (styrene-isoprene) random copolymer, a styrene-isoprene diblock copolymer, a (styrene polymer block)-[(styrene-isoprene) random copolymer block] diblock copolymer, a [(styrene-isoprene) random copolymer block]-(isoprene polymer block) diblock copolymer, a [(styrene-isoprene) random copolymer block]-[(styrene-isoprene) random copolymer block] diblock copolymer. When these block copolymers are used, the resulting adhesive composition for labels acquire particularly excellent adhesiveness and die cutting properties.

The adhesive composition for labels of the present invention may contain only one kind of polymer or block copolymer as the polymer C, or may contain two or more kinds of polymers or block copolymers as the polymer C.

The adhesive composition of the present invention preferably contains at least one kind of isoprene unit-containing polymer selected from a conjugated diene polymer containing an isoprene unit, and a block copolymer having a conjugated diene polymer block containing an isoprene unit at an end of the polymer chain, as the polymer C. Among them, it is particularly preferable that the adhesive composition for labels contain a block copolymer C1 represented by the following general formula (C1) as the isoprene unit-containing polymer.

$$Ar^c\text{-}PI \qquad (C1)$$

In the general formula (C1), $Ar^c$ represents an aromatic vinyl polymer block having a weight average molecular weight of 6,000 to 20,000; and PI represents an isoprene polymer block having a vinyl bond content of 1 mol % to 20 mol %.

The block copolymer C1 that can be contained in the adhesive composition for labels of the present invention is an aromatic vinyl-isoprene diblock copolymer which is composed of an aromatic vinyl polymer block ($Ar^c$) having a specific weight average molecular weight linked to an isoprene polymer block (PI) having a specific vinyl bond content, as represented by the general formula (C1) shown above. As the aromatic vinyl monomer used to constitute the aromatic vinyl monomer unit, the same aromatic vinyl monomers as those used to construct the aromatic vinyl polymer blocks of the block copolymer A and the block copolymer B can be used. Furthermore, the weight average molecular weight ($Mw(Ar^c)$) of the aromatic vinyl polymer block ($Ar^c$) constituting the block copolymer C1 is 6,000 to 20,000, preferably 7,000 to 18,000, and more preferably 8,000 to 16,000. In addition, it is more preferable that the weight average molecular weight ($Mw(Ar^c)$) of the aromatic vinyl polymer block of the block copolymer C1 be substantially identical with the weight average molecular weight ($Mw(Ar1^a)$) of the aromatic vinyl polymer block ($Ar1^a$) having a relatively small weight average molecular weight of the block copolymer A.

The isoprene polymer block (PI) of the block copolymer C1 is a polymer block composed of an isoprene monomer unit. A portion of the unsaturated bonds of the isoprene polymer block (PI) may be subjected to a hydrogenation reaction. Furthermore, the isoprene polymer block (PI) may contain a monomer unit other than the isoprene monomer unit. Examples of a monomer which constitutes the monomer unit other than the isoprene monomer unit that can be contained in the isoprene polymer block (PI), include a conjugated diene monomer other than isoprene, such as 1,3-butadiene; an aromatic vinyl monomer such as styrene and α-methylstyrene; an α,β-unsaturated nitrile monomer, an unsaturated carboxylic acid or acid anhydride monomer, an unsaturated carboxylic acid ester monomer, and a non-conjugated diene monomer. The content of the monomer unit other than the isoprene monomer unit in the isoprene polymer block (PI) is preferably 20% by weight or less, and more preferably 10% by weight or less, and it is particularly preferable that the content be substantially 0% by weight.

The vinyl bond content of the isoprene polymer block (PI) of the block copolymer C1 is 1 mol % to 20 mol %, preferably 2 mol % to 15 mol %, and more preferably 3 mol % to 10 mol %. It is preferable that the vinyl bond content of the isoprene polymer block (PI) of the block copolymer C1 be substantially equal to the vinyl bond content of the conjugated diene polymer block ($D^a$) of the block copolymer A.

There are no particular limitations on the weight average molecular weight ($Mw(PI)$) of the isoprene polymer block (PI) of the block copolymer C1, but the weight average molecular weight is usually 20,000 to 200,000, preferably 30,000 to 150,000, and more preferably 35,000 to 100,000. Furthermore, it is preferable that the weight average molecular weight ($Mw(PI)$) of the isoprene polymer block (PI) of the block copolymer C1 be substantially identical with the weight average molecular weight ($Mw(D^a)$) of the conjugated diene polymer block ($D^a$) of the block copolymer A.

The content of the aromatic vinyl monomer unit relative to the total amount of the monomer units of the block copolymer C1 is not particularly limited, but is usually 10% to 35% by weight, preferably 12% to 32% by weight, and more preferably 15% to 30% by weight. Furthermore, the overall weight average molecular weight of the block copolymer C1 is also not particularly limited, but is usually 26,000 to 220,000, preferably 36,000 to 170,000, and more preferably 41,000 to 120,000.

There are no particular limitations on the molecular weight distribution, which is expressed as the ratio (Mw/Mn) of the weight average molecular weight (Mw) and the number average molecular weight (Mn), of the respective polymer blocks constituting the block copolymer C1, but the molecular weight distribution is usually 1.1 or less, and preferably 1.05 or less.

The adhesive composition for labels of the present invention preferably contains at least one kind of butadiene unit-containing polymer selected from a conjugated diene polymer containing a 1,3-butadiene unit, and a block copolymer having a conjugated diene polymer block containing a 1,3-butadiene unit at an end of the polymer chain. Examples of the butadiene unit-containing polymer that can be used as the polymer C include polybutadiene, a (styrene-butadiene) random copolymer, a styrene-butadiene diblock copolymer, a (styrene polymer block)-[(styrene-butadiene) random copolymer block] diblock copolymer, a [(styrene-butadiene) random copolymer block]-(butadiene polymer block) diblock copolymer, and a [(styrene-butadiene) random copolymer block]-[(styrene-butadiene) random copolymer block] diblock copolymer. Among these, polybutadiene, a (styrene-butadiene) random copolymer, a styrene-butadiene diblock copolymer, and a (styrene polymer block)-[(styrene-butadiene) random copolymer block] diblock copolymer are suitable, and a (styrene polymer block)-[(styrene-butadiene) random copolymer block] diblock copolymer is particularly suitable.

For the adhesive composition for labels of the present invention, a composition containing at least one kind of isoprene unit-containing polymer selected from a conjugated diene polymer containing an isoprene unit, and a block copolymer having a conjugated diene polymer block containing an isoprene unit at an end of the polymer chain; as well as at least one kind of butadiene unit-containing polymer selected from a conjugated diene polymer containing a 1,3-butadiene unit, and a block copolymer having a conjugated diene polymer block containing a 1,3-butadiene unit at an end of the polymer chain, such as those described above as the polymer C in particular is used with preference. When both the isoprene unit-containing polymer and the butadiene unit-containing polymer are contained as the polymer C, the resulting adhesive composition for labels becomes particularly excellent in view of adhesiveness or die cutting properties. In this case, the weight ratio of the isoprene unit-containing polymer and the butadiene unit-containing polymer is preferably 10/90 to 90/10, and more preferably 20/80 to 80/20.

There are no particular limitations on the weight ratio (A/C) of the block copolymer A and the polymer C in the adhesive composition for labels of the present invention, but the weight ratio is preferably 5/95 to 95/5, more preferably 10/90 to 90/10, and even more preferably 20/80 to 80/20. When the block copolymer A and the polymer C are contained at such a weight ratio, the resulting adhesive composition for labels has excellent holding power and has excellent tackiness and die cutting properties, while having a low melt viscosity in particular.

In the adhesive composition for labels of the present invention, the proportion occupied by the aromatic vinyl monomer units (hereinafter, may be referred to as "total aromatic vinyl monomer unit content") relative to the total amount of the polymer components, consisting of the block copolymer A, the block copolymer B which is a component that is optionally contained, and the polymer C, is not particularly limited. However, the proportion is preferably 13% to 85% by weight, more preferably 18% to 70% by weight, and even more preferably 20% to 60% by weight. If the total aromatic vinyl monomer unit content is too small, there is a risk that the resulting adhesive composition for labels may have poor holding power. If the total aromatic vinyl monomer unit content is too large, there is a risk that the resulting adhesive composition for labels may become too hard and have a poor adhesive force. This total aromatic vinyl monomer unit content can be easily regulated by regulating the amounts of incorporation of the respective aromatic vinyl monomer units of the block copolymer A, the block copolymer B which is a component that is optionally contained, and the polymer C, which constitute the adhesive composition for labels, while considering the contents of the aromatic vinyl monomer units in the respective polymers. Furthermore, in case where all the polymer components that constitute the adhesive composition for label are composed of aromatic vinyl monomer units and conjugated diene monomer units only, when the polymer components are subjected to ozone decomposition and then to reduction with lithium aluminum hydride according to the method described in Rubber Chem. Technol., 45, 1295 (1972), the conjugated diene monomer unit portion is decomposed, and only the aromatic vinyl monomer unit portion can be extracted. Therefore, the total aromatic vinyl monomer unit content can be easily measured.

The adhesive composition for labels of the present invention may contain only the block copolymer A and the polymer C as the polymer components; however, the adhesive composition may also contain the block copolymer B or a polymer component other than those polymers. Examples of the polymer component other than the block copolymer A, block copolymer B and polymer C that can be contained in the adhesive composition for labels of the present invention, include an aromatic vinyl-conjugated diene-aromatic vinyl block copolymer other than the block copolymer A and the block copolymer B, an aromatic vinyl homopolymer, an aromatic vinyl-conjugated diene random copolymer having a glass transition temperature of higher than −30° C., and branched polymers thereof; as well as thermoplastic resins such as polyethylene, polypropylene, polyvinyl chloride, an acrylonitrile-styrene copolymer, an acrylonitrile-butadiene-styrene copolymer, and a polyphenylene ether. The content of the polymer component other than the block copolymer A, block copolymer B and polymer C (provided that the tackifier resin or softening agent that will be described later is not intended to be contained in this component) in the adhesive composition for labels of the present invention is preferably 20% by weight or less, and more preferably 10% by weight or less, relative to the total amount of the polymer components.

There are no particular limitations on the overall weight average molecular weight of the polymer components constituting the adhesive composition for labels of the present invention, consisting of the block copolymer A, the block copolymer B which is a component that is optionally contained, and the polymer C. However, the overall weight average molecular weight is usually 50,000 to 500,000, preferably 60,000 to 450,000, and more preferably 70,000 to 400,000. Furthermore, there are no particular limitations on the overall molecular weight distribution, which is expressed as the ratio (Mw/Mn) of the weight average molecular weight (Mw) and the number average molecular weight (Mn), of these polymer components, but the molecular weight distribution is usually 1.01 to 10, preferably 1.03 to 5, and more preferably 1.05 to 3.

There are no particular limitations on the methods for obtaining the block copolymer A, the block copolymer B which is a component that is optionally contained, and the polymer C that are used in the present invention. For example, the polymers can be produced by separately producing each of the polymers according to conventional polymerization methods, incorporating other polymer components and the like according to necessity, and then mixing the components according to a conventional method such as kneading or solution mixing. However, from the viewpoint of obtaining these polymers with high productivity, the production method that will be described below is suitable.

That is, the block copolymer A, the block copolymer B and the polymer C used in the present invention are preferably produced by using a production method which comprises the following steps (1) to (5).

(1): A step of polymerizing an aromatic vinyl monomer using a polymerization initiator in a solvent.

(2): A step of adding a conjugated diene monomer to the solution containing an aromatic vinyl polymer having an active terminal, which is obtained in the step (1).

(3): A step of adding a coupling agent and a polymerization terminator to the solution containing an aromatic vinyl-conjugated diene block copolymer having an active terminal, which is obtained in the step (2), in an amount such that the total amount of the functional groups of the coupling agent and the polymerization terminator is less than 1 molar equivalent with respect to the active terminal of the aromatic vinyl-conjugated diene block copolymer having an active terminal, and thereby forming a block copolymer B and a polymer C.

(4): A step of adding an aromatic vinyl monomer to the solution that is obtained in the step (3), and thereby forming a block copolymer A.

(5): A step of collecting the polymer components from the solution that is obtained in the step (4).

In the production method described above, first, an aromatic vinyl monomer is polymerized by using a polymerization initiator in a solvent (Step (1)). Examples of the polymerization initiator that may be used include an organic alkali metal compound, an organic alkaline earth metal compound, and an organic lanthanoid series rare earth metal compound, which are generally known to have an anionic polymerization activity toward aromatic vinyl monomers and conjugated diene monomers. As the organic alkali metal compound, an organolithium compound having one or more lithium atoms in the molecule is particularly suitably used, and specific examples thereof include organic monolithium compounds such as ethyllithium, n-propyllithium, isopropyllithium, n-butyllithium, sec-butyllithium, t-butyllithium, hexyllithium, phenyllithium, stilbenelithium, dialkylaminolithium, diphenylaminolithium, and ditrimethylsilylaminolithium; organic dilithium compounds such as methylenedilithium, tetramethylenedilithium, hexamethylenedilithium, isoprenyldilithium, and 1,4-dilithio-ethylcyclohexane; and organic trilithium compounds such as 1,3,5-trilithiobenzene. Among these, organic monolithium compounds are particularly suitably used.

Examples of the organic alkaline earth metal compound that is used as a polymerization initiator include n-butylmagnesium bromide, n-hexylmagnesium bromide, ethoxycalcium, calcium stearate, t-butoxystrontium, ethoxybarium, isopropoxybarium, ethylmercaptobarium, t-butoxybarium, phenoxybarium, diethylaminobarium, barium stearate, and ethylbarium. Furthermore, specific examples of other polymerization initiators include compounds which form a homogeneous system in an organic solvent and have living polymerizability, such as a composite catalyst formed from a lanthanoid series rare earth metal compound containing neodymium, samarium, gadolinium or the like/alkylaluminum/alkylaluminum halide/alkylaluminum hydride, and a metallocene type catalyst containing titanium, vanadium, samarium, gadolinium or the like. These polymerization initiators may be used singly, or as mixtures of two or more kinds.

The amount of use of the polymerization initiator may be determined in accordance with the desired molecular weight of each block copolymer and is not particularly limited. However, the amount of use is usually 0.01 to 20 millimoles, preferably 0.05 to 15 millimoles, and more preferably 0.1 to 10 millimoles, per 100 g of all kinds of monomers used.

There are no particular limitations on the solvent used in the polymerization as long as the solvent is inert to the polymerization initiator, and for example, an aliphatic hydrocarbon solvent, a cyclic hydrocarbon solvent, or a solvent mixture thereof is used. Examples of the aliphatic hydrocarbon solvent include aliphatic alkanes and alkenes having 4 to 6 carbon atoms, such as n-butane, isobutane, 1-butene, isobutylene, trans-2-butene, cis-2-butene, 1-pentene, trans-2-pentene, cis-2-pentene, n-pentane, isopentane, neopentane, and n-hexane. Specific examples of the cyclic hydrocarbon solvent include aromatic compounds such as benzene, toluene and xylene; and alicyclic hydrocarbon compounds such as cyclopentane and cyclohexane. These solvents may be used singly, or as mixtures of two or more kinds.

There are no particular limitations on The amount of the solvent used in the polymerization, but the amount is usually set such that the total concentration of the block copolymers in the solution after the polymerization reaction is 5% to 60% by weight, preferably 10% to 55% by weight, and more preferably 20% to 50% by weight.

A Lewis base compound may be added to the reactor used in the polymerization, in order to control the structures of the various polymer blocks of the respective block copolymers. Examples of this Lewis base compound include ethers such as tetrahydrofuran, diethyl ether, dioxane, ethylene glycol dimethyl ether, ethylene glycol dibutyl ether, diethylene glycol dimethyl ether, and diethylene glycol dibutyl ether; tertiary amines such as tetramethylethylenediamine, trimethylamine, triethylamine, pyridine, and quinuclidine; alkali metal alkoxides such as potassium t-amyloxide and potassium t-butyloxide; and phosphines such as triphenylphosphine. These Lewis base compounds are used singly or in combination of two or more kinds, and are appropriately selected to the extent of not impairing the purposes of the present invention.

Furthermore, the timing for adding the Lewis base compound during the polymerization reaction is not particularly limited and may be appropriately determined in accordance with the structures of the respective desired block copolymers. For example, the Lewis base compound may be added in advance prior to initiation of the polymerization, or may be added after completion of the polymerization of a portion of the polymer blocks. It is also acceptable to add the Lewis base compound in advance prior to initiation of the polymerization and then to further add the Lewis base compound after completion of the polymerization of a portion of the polymer blocks.

The polymerization reaction temperature is usually 10° C. to 150° C., preferably 30° C. to 130° C., and more preferably 40° C. to 90° C. The time required for the polymerization may vary with the conditions, but the time is usually within 48 hours, and preferably 0.5 to 10 hours. The polymerization pressure may be set in a pressure range sufficient to maintain the monomers and the solvent in the liquid state in the polymerization temperature range, and there are no particular limitations on the pressure.

When an aromatic vinyl monomer is polymerized under the conditions such as described above using a polymerization initiator in a solvent, a solution containing an aromatic vinyl polymer having an active terminal can be obtained. This aromatic vinyl polymer having an active terminal will constitute the aromatic vinyl polymer block ($Ar1^a$) having a relatively small weight average molecular weight of the block copolymer A, the aromatic vinyl polymer block ($Ar^b$) of the block copolymer B, and the aromatic vinyl polymer block of the polymer C. Therefore, the amount of the aromatic vinyl monomers used at this time is determined in accordance with the intended weight average molecular weights of these polymer blocks.

The next step is a step of adding a conjugated diene monomer to the solution containing an aromatic vinyl polymer having an active terminal, which is obtained as described above (Step (2)). The addition of this conjugated diene monomer leads to the formation of a conjugated diene polymer chain starting from the active terminal, and thus a solution containing an aromatic vinyl-conjugated diene block copolymer having an active terminal is obtained. The amount of the conjugated diene monomer used at this time is determined such that the conjugated diene polymer chain thus obtainable has the weight average molecular weights of the intended conjugated diene polymer block ($D^b$) of the block copolymer B and the intended conjugated diene polymer block of the polymer C.

In the next step, a coupling agent and a polymerization terminator are added to the solution containing the aromatic vinyl-conjugated diene block copolymer having an active terminal, which is obtained as described above, in an amount such that the total amount of the functional groups of the coupling agent and the polymerization terminator is less than 1 molar equivalent with respect to the active terminal of the aromatic vinyl-conjugated diene block copolymer having an active terminal (Step (3)).

There are no particular limitations on the coupling agent that is added in this step, and any bi- or higher-functional coupling agent can be used. Examples of a bifunctional coupling agent include bifunctional halogenated silanes such as dichlorosilane, monomethyldichlorosilane, and dimethyldichlorosilane; bifunctional alkoxysilanes such as diphenyldimethoxysilane, and diphenyldiethoxysilane; bifunctional halogenated alkanes such as dichloroethane, dibromoethane, methylene chloride, and dibromomethane; bifunctional halogenated tin compounds such as dichlorotin, monomethyldichlorotin, dimethyldichlorotin, monoethyldichlorotin, diethyldichlorotin, monobutyldichlorotin, and dibutyldichlorotin; dibromobenzene, benzoic acid, CO, and 2-chloropropene. Examples of a trifunctional coupling agent include trifunctional halogenated alkanes such as trichloroethane and trichloropropane; trifunctional halogenated silanes such as methyltrichlorosilane and ethyltrichlorosilane; and trifunctional alkoxysilanes such as methyltrimethoxysilane, phenyltrimethoxysilane, and phenyltriethoxysilane. Examples of a tetrafunctional coupling agent include tetrafunctional halogenated alkanes such as carbon tetrachloride, carbon tetrabromide, and tetrachloroethane; tetrafunctional halogenated silanes such as tetrachloroethane and tetrabromosilane; tetrafunctional alkoxysilanes such as tetramethoxysilane and tetraethoxysilane; and tetrafunctional halogenated tin compounds such as tetrachlorotin and tetrabromotin. Examples of a penta—or higher-functional coupling agent include 1,1,1,2,2—pentachloroethane, perchloroethane, pentachlorobenzene, perchlorobenzene, octabromodiphenyl ether, and decabromodiphenyl ether. These coupling agents may be used singly, or two or more kinds can be used in combination.

There are no particular limitations also on the polymerization terminator in this step, and conventionally known polymerization terminators can be used without particular limitations. Examples of polymerization terminators that are particularly suitably used include alcohols such as methanol, ethanol, propanol, butanol, and isopropanol.

When a coupling agent is added to the solution containing the aromatic vinyl-conjugated diene block copolymer having an active terminal, a conjugated diene polymer block of the aromatic vinyl-conjugated diene block copolymer having an active terminal is linked to another such conjugated diene polymer block via the residue of the coupling agent. As a result, the block copolymer B is formed. Furthermore, when a polymerization terminator is also added to this solution, the active terminal of the aromatic vinyl-conjugated diene block copolymer having an active terminal is deactivated, and as a result, the polymer C which is an aromatic vinyl-conjugated diene diblock copolymer is formed. Among others, when isoprene is used as the conjugated diene monomer, a block copolymer C1 represented by the general formula (C1) is formed. Here, there are no particular limitations on the order of adding the coupling agent and the polymerization terminator, and any one of them may be added first, followed by addition of the other, or both of them may be added at the same time.

The amounts of the coupling agent and the polymerization terminator that are added in this step are needed to be adjusted such that the total amount of the functional groups of those agents is less than 1 molar equivalent with respect to the active terminal of the aromatic vinyl-conjugated diene block copolymer having an active terminal. This is because there is a need to have a portion of the aromatic vinyl-conjugated diene block copolymer having an active terminal left in the solution, in order to carry out the step of forming the block copolymer A, which is the subsequent step. The amounts of the coupling agent and the polymerization terminator are preferably such that the total amount of the functional groups of those agents with respect to the active terminal of the polymer is in the range of 0.10 to 0.90 molar equivalents, and more preferably in the range of 0.15 to 0.70 molar equivalents. Furthermore, since the amount of the coupling agent that is added in this step is a determining factor of the amount of the block copolymer B, and since the amount of the reaction terminator is a determining factor of The amount of the polymer C, the respective amounts may be determined in accordance with the intended composition of the polymer components. In addition, if there is no need to form the block copolymer B and the polymer C, this step may be omitted.

There are no particular limitations on the reaction conditions for the coupling reaction or the polymerization termination reaction, and generally, the reaction conditions may be set up in the same scope as that of the polymerization reaction conditions described above.

In the next step, an aromatic vinyl monomer is added to the solution obtained as described above (Step (4)). When an aromatic vinyl monomer is added to the solution, an aromatic vinyl polymer chain is formed from the terminal of the aromatic vinyl-conjugated diene block copolymer having an active terminal, which is left unreacted with the coupling agent or the polymerization terminator. This aromatic vinyl polymer chain will constitute the aromatic vinyl polymer block ($Ar2^a$) having a relatively large weight average molecular weight of the block copolymer A. Therefore, the amount of the aromatic vinyl monomer used at this time is determined in accordance with the intended weight average molecular weight of the aromatic vinyl polymer block ($Ar2^a$). This step of adding an aromatic vinyl monomer leads to the formation of an asymmetric aromatic vinyl-conjugated diene-aromatic vinyl block copolymer which constitutes the block copolymer A, and as a result, a solution containing the block copolymers A to C is obtained. In addition, it is also acceptable to add a conjugated diene monomer to the solution containing the aromatic vinyl-conjugated diene block copolymer having an active terminal, which is left unreacted with the coupling agent or the polymerization terminator, before this step of adding an aromatic vinyl monomer. When a conjugated diene monomer is added as such, the weight average molecular weight of the conjugated diene polymer block ($D^a$) of the block copolymer A can be made larger as compared with the case where the conjugated diene monomer is not added.

In the next step, the intended polymer components are collected from the solution that is obtained as described above (Step (5)). The method of collection may be carried out according to a conventional method, and is not particularly limited. For example, the polymer components can be collected by adding, if necessary, a polymerization terminator such as water, methanol, ethanol, propanol, hydrochloric acid or citric acid after completion of the reaction, further adding additives such as an antioxidant as necessary, and then applying a known method such as a direct drying method or a steam stripping method to the solution. Incase where the polymer components are collected in the form of slurry by applying steam stripping or the like, the slurry is dehydrated using any dehydrator such as an extruder type squeezer to produce crumb having a water content that is equal to or less than a predetermined value. The crumb may be further dried using any dryer such as a band dryer or an expansion-extrusion dryer. The polymer components obtainable as described above may be processed into pellets or the like according to a conventional method, and then supplied to the production of an adhesive composition for labels or the like.

According to the production method described above, since the block copolymer A, block copolymer B and polymer C used in the present invention can all be continuously obtained in a same reaction vessel, the target polymer components can be obtained with superior productivity as compared with the case of individually producing the respective polymers and mixing them.

The adhesive composition for labels of the present invention is a composition comprising polymer components containing the block copolymer A, the block copolymer B which is a component that is optionally contained, and the polymer C as described above, and a tackifier resin. As the tackifier resin to be used in the present invention, any conventionally known tackifier resin can be used. Specific examples thereof include rosin; modified rosins such as heterogeneous rosin and dimerized rosin; esterification products between polyhydric alcohols such as glycol, glycerin and pentaerythritol, and rosin or modified rosins; terpene resins; aliphatic, aromatic, alicyclic, or aliphatic-aromatic copolymer-based hydrocarbon resins, or hydrogenation products thereof; phenolic resins; and coumarone-indene resins. A tackifier resin that is particularly preferably used is an aliphatic or aliphatic-aromatic copolymer-based hydrocarbon resin which is highly compatible with the polymer components used in the present invention. There are no particular limitations on the amount of use of the tackifier resin in the adhesive composition for labels of the present invention. However, the amount of use is usually 10 to 500 parts by weight, preferably 50 to 350 parts by weight, and more preferably 70 to 250 parts by weight, per 100 parts by weight of the polymer components consisting of the block copolymer A, the block copolymer B which is a component that is optionally contained, and the polymer C. In addition, the tackifier resins may be used singly, or two or more kinds thereof may be used in combination.

The adhesive composition for labels of the present invention preferably further contains a softening agent. As the softening agent, conventionally known softening agents can be used. Specifically, use can be made of aromatic, paraffinic or naphthenic extender oils; liquid polymers such as polybutene and polyisobutylene; and the like, which are added to conventional hot melt adhesive compositions. There are no particular limitations on the amount of use of the softening agent, but the amount of use is 500 parts by weight or less, preferably 10 to 350 parts by weight, and more preferably 30 to 250 parts by weight, per 100 parts by weight of the polymer components consisting of the block copolymer A, the block copolymer B which is a component that is optionally contained, and the polymer C. The softening agents may be used singly, or two or more kinds may be used in combination.

In the adhesive composition for labels of the present invention, an antioxidant can be added according to necessity. There are no particular limitations on the type, and examples of the antioxidant that can be used include hindered phenolic compounds such as pentaerythritol tetrakis[3-(3,5-di-t-butyl-4-hydroxyphenyl)propionate], 2,6-di-t-butyl-p-cresol, and di-t-butyl-4-methylphenol; thiodicarboxylate esters such as dilauryl thiopropionate; and phosphites such as tris(nonylphenyl) phosphite. There are no particular limitations on the amount of use of the antioxidant, but the amount of use is usually 10 parts by weight or less, and preferably 0.5 to 5 parts by weight, per 100 parts by weight of the polymer components including the block copolymer A, the block copolymer B which is a component that is optionally contained, and the polymer C. The antioxidants may be used singly, or two or more kinds may be used in combination.

The adhesive composition for labels of the present invention can further contain other additives such as a thermal stabilizer, an ultraviolet absorber, and a filler. In addition, the adhesive composition for labels of the present invention is preferably a solventless composition which does not contain a solvent.

Upon the preparation of the adhesive composition for labels of the present invention, the method of mixing the polymer components with a tackifier resin or various additives is not particularly limited, and examples of the method include a method of dissolving the various components in a solvent, uniformly mixing them, and then removing the solvent by heating or the like; and a method of heating, melting and mixing the various components with a kneader or the like. Furthermore, upon the preparation of the adhesive composition for labels of the present invention, for example, one kind of the polymer C (block copolymer C1) may be synthesized together with the block copolymer A in a reactor, and then another polymer C may be separately incorporated therein.

The adhesive composition for labels of the present invention can be applied to the manufacture of labels according to a conventional method. For example, the adhesive composition for labels of the present invention is melted by heating, subsequently cut into a certain size by a die, and then is applied on a paper substrate such as a high quality paper, an art paper, a cast paper, a thermal paper, or a foil paper, or on a film substrate such as a synthetic resin film of polyethylene terephthalate or the like, or a cellophane film, or is applied on a releasing paper. Subsequently, the adhesive composition for labels is transferred to the substrate such as described above, and thus a label is produced. Since the adhesive composition for labels of the present invention can be easily applied at a relatively low temperature and has satisfactory die cutting properties, the adhesive composition contributes to a decrease in the reject rate and an enhancement of productivity in the manufacture of such labels. Furthermore, the labels that are obtained have excellent holding power and tackiness. In regard to the applications, the adhesive composition for labels are extensively used in product labels on container packaging for food products, beverages and alcoholic beverages, or in variable information labels. The adhesive composition for labels is also widely used in the fields of logistics, electric/precision instruments, pharmaceutics/medicine, cosmetics/toiletries, stationeries/office appliances, automobiles, and the like.

EXAMPLES

Hereinafter, the present invention will be more specifically described by way of Examples and Comparative Examples. In addition, the units "parts" and "percentage (%)" in the respective Examples are on a weight basis unless particularly stated otherwise.

Various analyses were carried out according to the following methods.

[Weight Average Molecular Weight of Each Polymer Among Polymer Components]

The weight average molecular weight was determined as a molecular weight relative to polystyrene standards, by high performance liquid chromatography using tetrahydrofuran as a carrier at a flow rate of 0.35 ml/min. For the apparatus, HLC8220™ manufactured by Tosoh Corporation was used, and three connected columns of Shodex KF-404HQ™ manufactured by Showa Denko K.K. (column temperature 40° C.) were used. A differential refractometer and an ultraviolet detector were used as the detectors, and the calibration of molecular weight was carried out using 12 samples of standard polystyrenes (from 500 to 3,000,000) manufactured by Polymer Laboratories, Ltd.

[Weight Ratios of Various Polymers Among Polymer Components]

The weight ratios were determined from the area ratios of the peaks corresponding to the respective block copolymers in the charts obtained by high performance liquid chromatography as described above.

[Weight Average Molecular Weight of Styrene Polymer Block of Block Copolymer]

A block copolymer was allowed to react with ozone and was reduced with lithium aluminum hydride according to the method described in Rubber Chem. Technol., 45, 1295 (1972), and thereby the isoprene polymer block of the block copolymer was decomposed. Specifically, the operation was carried out by the following procedure. That is, 300 mg of a sample was dissolved in a reaction vessel charged with 100 ml of dichloromethane that had been treated with a molecular sieve. This reaction vessel was placed in a cooling bath and was kept at −25° C. While oxygen was passed into the reaction vessel at a flow rate of 170 ml/min, ozone generated by an ozone generator was introduced into the reaction vessel. After a lapse of 30 minutes from the initiation of reaction, the gas flowing out from the reaction vessel was introduced into an aqueous solution of potassium iodide, and thereby completion of the reaction was confirmed. Subsequently, 50 ml of diethyl ether and 470 mg of lithium aluminum hydride were introduced into another reaction vessel which had been substituted with nitrogen, and while the reaction vessel was cooled with ice water, the ozone-reacted solution was slowly added dropwise to this reaction vessel. Then, the reaction vessel was placed in a water bath and gradually heated, and the content of the reaction vessel was heated to reflux for 30 minutes at 40° C. Subsequently, dilute hydrochloric acid was added dropwise in small amounts to the reaction vessel while the solution was stirred, and the dropwise addition was continued until the generation of hydrogen was almost undetectable. After this reaction, the solid product formed in this solution was separated by filtration, and the solid product was extracted with 100 ml of diethyl ether for 10 minutes. This extract was combined with the filtrate obtained at the time of separation by filtration, and the solvent was distilled off to obtain a solid sample. The sample thus obtained was analyzed for the weight average molecular weight according to the method for measuring the weight average molecular weight, and the value thereof was designated as the weight average molecular weight of a styrene polymer block.

[Weight Average Molecular Weight of Isoprene Polymer Block of Block Copolymer]

From the respective weight average molecular weights of the block copolymers determined as described above, the weight average molecular weight of a corresponding styrene polymer block was subtracted, and the weight average molecular weight of an isoprene polymer block was determined based on the calculated values.

[Styrene Unit Content of Block Copolymer]

The styrene unit content was determined based on the intensity ratio of the detections made by the differential refractometer and the ultraviolet detector in the above-mentioned analysis carried out by high performance liquid chromatography. Copolymers having different styrene unit contents were prepared in advance, and a calibration curve was produced using the copolymers.

[Styrene Unit Content of Polymer Components (Total)]

The styrene unit content was determined based on an analysis by proton NMR.

[Vinyl Bond Content of Isoprene Polymer Block]

The vinyl bond content was determined based on an analysis by proton NMR.

[Tackiness of Adhesive Composition for Labels]

The loop tack was measured according to FINAT-1991 FTM-9 (Quick-stick tack measurement), and thus tackiness was evaluated. A larger value means excellent tackiness.

[Adhesive Force of Adhesive Composition for Labels]

The adhesive force was evaluated by measuring the peel adhesive strength at normal temperature (N/m), at 23° C. using a hard polyethylene plate as an adherend, according to PSTC-1 (the 180° peel adhesion test according to the Pressure Sensitive Tape Council, USA). A larger value means excellent adhesive force.

[Holding Power of Adhesive Composition for Labels]

An adhesive tape having a width of 10 mm was used as a sample, and hard polyethylene was used as an adherend, to evaluate holding power based on the time (minute) taken by the sample to peel off under the conditions of using an adhesive part having an area of 10×25 mm, a load of $3.92 \times 10^4$ Pa, and a temperature of 40° C., according to PSTC-6 (the holding power test method according to the Pressure Sensitive Tape Council, USA). A larger value means excellent holding power.

[Glass Transition Temperature and Tan δ Value at 20° C. of Adhesive Composition for Labels]

The values were calculated by a dynamic viscoelasticity analysis. For the measuring instrument, an ARES™ manufactured by TA Instruments Japan Inc. was used. A sample for measurement was formed into parallel plates each having a thickness of 2 mm and a diameter of 8 mm, and the measurement was carried out. The measurement conditions included a rate of temperature increase of 4° C./min, a strain of 0.1%, and a frequency of 10 radian/sec. The measurement temperature range was set from −120° C. to 200° C. The peak top of the tan δ curve was defined as the glass transition temperature. As the glass transition temperature is lower, the adhesive performance or tackiness at low temperature is excellent, and as the tan δ value at 20° C. is higher, the die cutting properties are excellent.

Reference Example 1

In a pressure resistant reactor, 23.3 kg of cyclohexane, 3.10 millimoles of N,N,N',N'-tetramethylethylenediamine (hereinafter, referred to as TMEDA), and 0.83 kg of styrene were added, and while the mixture was stirred at 40° C., 104.2 millimoles of n-butyllithium was added thereto. While the temperature was elevated to 50° C., polymerization was carried out for one hour. The polymerization conversion ratio for styrene was 100% by weight. Subsequently, while the temperature was controlled to be maintained at 50° C. to 60° C., 7.50 kg of isoprene was continuously added to the reactor for one hour. After completion of the addition of isoprene, polymerization was carried out for another one hour. The polymerization conversion ratio for isoprene was 100%. Thereafter, 23.4 millimoles of dimethyldichlorosilane was added to the reactor as a coupling agent, and a coupling reaction was carried out for 2 hours. Thus, a styrene-isoprene-styrene block copolymer was formed, which would serve as a block copolymer B. Thereafter, while the temperature was controlled to be maintained at 50° C. to 60° C., 1.67 kg of styrene was continuously added to the reactor for one hour. After completion of the addition of styrene, polymerization was carried out for another one hour, and thus a styrene-isoprene-styrene block copolymer was formed, which would serve as a block copolymer A. The polymerization conversion ratio for styrene was 100%. Subsequently, 208.4 millimoles of methanol was added to the system as a polymerization terminator, the resulting mixture was thoroughly mixed, and the reaction was terminated. The amounts of the various agents used in the reaction are summarized in Table 1. To 100 parts of the reaction liquid thus obtained (containing 30 parts of the polymer components), 0.3 parts of 2,6-di-tert-butyl-p-cresol was added as an antioxidant and was mixed with the reaction liquid. The mixed solution was added dropwise in small amounts into hot water which was heated to 85° C. to 95° C., to thereby volatilize the solvent, and a precipitate was thus obtained. This precipitate was pulverized and dried with hot air at 85° C. Thus, a composition of Reference Example 1 was collected. A portion of the reaction liquid thus obtained was taken out, and the weight average molecular weights of the respective polymers contained, the weight ratio of the various polymers among the polymer components, the weight average molecular weights of the styrene polymer blocks of the respective block copolymers, the weight average molecular weights of the isoprene polymer blocks of the respective block copolymers, the styrene unit contents of the respective block copolymers, the styrene unit content of the polymer components (total), and the vinyl bond content of the isoprene polymer blocks of the respective block copolymers were determined. These values are presented in Table 2.

TABLE 1

| | Reference Example | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Cyclohexane (kg) | 23.3 | 23.3 | 23.3 | 23.3 | 23.3 | 23.3 | 23.3 | 23.3 | 23.3 | 23.3 | 23.3 | 23.3 |
| TMEDA (millimoles) | 3.10 | 4.30 | 4.00 | 4.38 | 5.02 | 3.21 | 4.42 | 2.51 | 3.75 | 2.57 | 2.52 | 2.80 |
| n-butyllithium (millimoles) | 104.2 | 142.3 | 134.4 | 145.8 | 167.2 | 213.7 | 147.2 | 83.5 | 250.0 | 85.7 | 84.0 | 93.0 |
| Styrene (kg) [1$^{st}$ stage of polymerization] | 0.83 | 1.54 | 1.33 | 1.75 | 1.69 | — | 2.20 | 0.90 | 1.80 | 1.10 | 1.10 | 1.1 |
| Isoprene (kg) [2$^{nd}$ stage of polymerization] | 7.50 | 7.00 | 7.00 | 7.00 | 6.00 | 10.0 | 5.60 | 8.20 | 8.20 | 7.00 | 7.50 | 7.00 |
| Dimethyldichlorosilane (millimoles) [After 2$^{nd}$ stage of polymerization] | 23.4 | 53.4 | — | 31.4 | — | — | — | — | — | — | — | — |
| Tetrachlorosilane (millimoles) [After 2$^{nd}$ stage of polymerization] | — | — | 13.4 | — | 14.6 | — | — | — | — | — | — | — |
| Methanol (millimoles) [After 2$^{nd}$ stage of polymerization] | — | — | 64.5 | 67.1 | 86.9 | — | — | — | — | 60.0 | 55.5 | 56.7 |
| Styrene (kg) [3$^{rd}$ stage of polymerization] | 1.67 | 1.46 | 1.67 | 1.25 | 2.31 | — | 2.20 | 0.90 | — | 1.90 | 1.40 | 1.90 |
| Methanol (millimoles) [After 3$^{rd}$ stage of polymerization] | 208.4 | 284.6 | 268.8 | 291.6 | 334.4 | 427.4 | 314.4 | 167.0 | 500.0 | 171.4 | 168.1 | 186.0 |

TABLE 2

| | Reference Example | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Block copolymer A | | | | | | | | | | | | |
| Weight average molecular weight of relatively small styrene block (Ar1$^a$) [Mw (Ar1$^a$)] | 8000 | 11000 | 9900 | 16000 | 10100 | — | — | — | — | 13400 | 12700 | 11500 |
| Weight average molecular weight of relatively large styrene block (Ar2$^a$) [Mw (Ar2$^a$)] | 40000 | 69000 | 103000 | 123000 | 106000 | — | — | — | — | 87000 | 47100 | 61400 |
| Mw (Ar2$^a$)/Mw (Ar1$^a$) | 5.0 | 6.3 | 10.4 | 7.7 | 10.5 | — | — | — | — | 6.5 | 3.7 | 5.4 |
| Weight average molecular weight of isoprene block (D$^a$) [Mw (D$^a$)] | 100000 | 74000 | 74100 | 89000 | 51900 | — | — | — | — | 124100 | 123200 | 117300 |
| Vinyl bond content of isoprene block (D$^a$) (%) | 7 | 7 | 7 | 7 | 7 | — | — | — | — | 7 | 7 | 7 |
| Weight average molecular weight of block copolymer A | 148000 | 154000 | 187000 | 228000 | 168000 | — | — | — | — | 224500 | 183000 | 190200 |
| Styrene unit content of block copolymer A (%) | 36.5 | 58.0 | 68.5 | 65.0 | 76.4 | — | — | — | — | 54.6 | 39.8 | 49.0 |
| Polymer C | | | | | | | | | | | | |
| Weight average molecular weight of styrene block (Ar$^c$) [Mw (Ar$^c$)] | — | — | 9900 | 16000 | 10100 | — | — | — | 10800 | 13400 | 12700 | 11500 |
| Weight average molecular weight of isoprene block (polyisoprene) [Mw (PI)] | — | — | 74100 | 89000 | 51900 | 80000 | — | — | 49200 | 124100 | 123200 | 117300 |
| Vinyl bond content of isoprene block | — | — | 7 | 7 | 7 | 7 | — | — | 7 | 7 | 7 | 7 |

TABLE 2-continued

| | Reference Example | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| (polyisoprene) (%) | | | | | | | | | | | | |
| Glass transition temperature of isoprene block (polyisoprene) (° C.) | — | — | −58 | −58 | −58 | −58 | — | — | −58 | −58 | −58 | −58 |
| Weight average molecular weight of polymer C | — | — | 84000 | 105000 | 62000 | 80000 | — | — | 60000 | 137600 | 136000 | 128900 |
| Styrene unit content of polymer C (%) | — | — | 16 | 20 | 22 | 0 | — | — | 18 | 14 | 12 | 13 |
| Block copolymer B | | | | | | | | | | | | |
| Number of branches (n) | 2 | 2 | 4 | 2 | 4 | — | 2 (X = single bond) | 2 (X = single bond) | — | — | — | — |
| Weight average molecular weight of styrene block (Ar$^b$) [Mw (Ar$^b$)] | 8000 | 11000 | 9900 | 16000 | 10100 | — | 15000 | 11000 | — | — | — | — |
| Weight average molecular weight of isoprene block (D$^b$) [Mw (D$^b$)] | 100000 | 74000 | 74100 | 89000 | 51900 | — | 29000 | 76000 | — | — | — | — |
| Vinyl bond content of isoprene block (D$^b$) (%) | 7 | 7 | 7 | 7 | 7 | — | 7 | 7 | — | — | — | — |
| Weight average molecular weight of block copolymer B | 216000 | 160000 | 318000 | 210000 | 233000 | — | 88000 | 174000 | — | — | — | — |
| Styrene unit content of block copolymer B (%) | 10 | 18 | 16 | 20 | 22 | — | 44 | 18 | — | — | — | — |
| Total polymer components | | | | | | | | | | | | |
| Weight average molecular weight | 167000 | 151000 | 188000 | 168000 | 143000 | 80000 | 88000 | 174000 | 60000 | 170000 | 157000 | 159500 |
| Styrene unit content (%) | 25 | 30 | 30 | 30 | 40 | 0 | 44 | 18 | 18 | 30 | 25 | 30 |
| Block copolymer A/polymerC/block copolymer B (weight ratio) | 60/0/40 | 34/0/66 | 30/40/30 | 23/60/17 | 37/40/23 | 0/100/0 | 0/0/100 | 0/0/100 | 0/100/0 | 41/59/0 | 44/56/0 | 49/51/0 |

Reference Example 2

A composition was prepared in the same manner as in Reference Example 1, except that the amounts of styrene, n-butyllithium, TMEDA, isoprene, dimethyldichlorosilane, and methanol were respectively changed as indicated in Table 1, and thus a composition of Reference Example 2 was collected. The composition of Reference Example 2 was subjected to the same analyses as in Reference Example 1. The results are presented in Table 2.

Reference Example 3

In a pressure resistant reactor, 23.3 kg of cyclohexane, 4.00 millimoles of TMEDA, and 1.33 kg of styrene were added, and while the mixture was stirred at 40° C., 134.4 millimoles of n-butyllithium was added thereto. While the temperature was elevated to 50° C., polymerization was carried out for one hour. The polymerization conversion ratio for styrene was 100% by weight. Subsequently, while the temperature was controlled to be maintained at 50° C. to 60° C., 7.00 kg of isoprene was continuously added to the reactor for one hour. After completion of the addition of isoprene, polymerization was carried out for another one hour. The polymerization conversion ratio for isoprene was 100%. Thereafter, 13.4 millimoles of tetrachlorosilane was added to the reactor as a coupling agent, and a coupling reaction was carried out for 2 hours. Thus, a branched styrene-isoprene-styrene block copolymer was formed, which would serve as a block copolymer B. After this coupling reaction, 64.5 millimoles of methanol was added to the reactor as a polymerization terminator, and a polymerization termination reaction was carried out for one hour. The active terminal of a portion of the styrene-isoprene block copolymer having an active terminal was deactivated, and thereby a styrene-isoprene diblock copolymer which would serve as the polymer C (block copolymer C1) was formed. Thereafter, while the temperature was controlled to be maintained at 50° C. to 60° C., 1.67 kg of styrene was continuously added to the reactor for one hour. After completion of the addition of styrene, polymerization was carried out for another one hour, and thus a styrene-isoprene-styrene block copolymer was formed, which would serve as a block copolymer A. The polymerization conversion ratio for styrene was 100%. Subsequently, 268.8 millimoles of methanol was added to the system as a polymerization terminator, the resulting mixture was thoroughly mixed, and the reaction was terminated. The amounts of the various reagents used in the reaction are summarized in Table 1. A portion of the reaction liquid thus obtained was taken out and was subjected to the same analyses as in Reference Example 1. These values are presented in Table 2. To 100 parts of the reaction liquid obtained as described above (containing 30 parts of the polymer components), 0.3 part of 2,6-di-tert-butyl-p-cresol was added as an antioxidant and was mixed with the reaction liquid. The mixed solution was added dropwise in small amounts into hot water which was heated to 85° C. to 95° C., to thereby volatilize the solvent, and a precipitate was thus obtained. This precipitate was pulverized and dried with hot air at 85° C. Thus, a composition of Reference Example 3 was collected.

Reference Example 4

A composition was prepared in the same manner as in Reference Example 3, except that 31.4 millimoles of dimethyldichlorosilane was used instead of tetrachlorosilane, and the amounts of styrene, n-butyllithium, TMEDA, isoprene, and methanol were respectively changed as indicated in Table 1, and thus a composition of Reference Example 4 was collected. The composition of Reference Example 4 was subjected to the same analyses as in Reference Example 1. The results are presented in Table 2.

Reference Example 5

A composition was prepared in the same manner as in Reference Example 3, except that the amounts of styrene, n-butyllithium, TMEDA, isoprene, tetrachlorosilane, and methanol were respectively changed as indicated in Table 1, and thus a composition of Reference Example 5 was collected. The composition of Reference Example 5 was subjected to the same analyses as in Reference Example 1. The results are presented in Table 2.

Reference Example 6

In a pressure resistant reactor, 23.3 kg of cyclohexane and 3.21 millimoles of TMEDA were added, and while the mixture was stirred at 40° C., 213.7 millimoles of n-butyllithium was added thereto. While the temperature was maintained at 50° C. to 60° C., 10.0 kg of isoprene was continuously added thereto for one hour. After completion of the addition of isoprene, polymerization was carried out for another one hour, and thus polyisoprene which would serve as the polymer C was formed. The polymerization conversion ratio for isoprene was 100%. Subsequently, 427.4 millimoles of methanol was added to the reaction liquid as a polymerization terminator. The resulting mixture was thoroughly mixed, and thereby the reaction was terminated. The amounts of the various reagents used in the reaction are summarized in Table 1. A portion of the reaction liquid thus obtained was taken out and was subjected to the same analyses as in Reference Example 1. These values are presented in Table 2. To 100 parts of the reaction liquid obtained as described above (containing 30 parts of the polymer components), 0.3 part of 2,6-di-tert-butyl-p-cresol was added as an antioxidant and was mixed with the reaction liquid. The mixed solution was added dropwise in small amounts into hot water which was heated to 85° C. to 95° C., to thereby volatilize the solvent, and a precipitate was thus obtained. This precipitate was pulverized and dried with hot air at 85° C. Thus, a composition of Reference Example 6 (polyisoprene) was collected.

Reference Example 7

In a pressure resistant reactor, 23.3 kg of cyclohexane, 4.42 millimoles of TMEDA, and 2.20 kg of styrene were added, and while the mixture was stirred at 40° C., 147.2 millimoles of n-butyllithium was added thereto. While the temperature was elevated to 50° C., polymerization was carried out for one hour. The polymerization conversion ratio for styrene was 100%. Subsequently, while the temperature was controlled to be maintained at 50° C. to 60° C., 5.60 kg of isoprene was continuously added to the reactor for one hour. After completion of the addition of isoprene, polymerization was carried out for another one hour. The polymerization conversion ratio for isoprene was 100%. Thereafter, while the temperature was controlled to be maintained at 50° C. to 60° C., 2.20 kg of styrene was continuously added over one hour. After completion of the addition of styrene, polymerization was further carried out for one hour, and thus a styrene-isoprene-styrene block copolymer was formed. The polymerization conversion ratio for styrene was 100%. Subsequently, 314.0 millimoles of methanol was added to the reaction liquid as a polymerization terminator. The resulting mixture was thoroughly mixed, and thereby the reaction was terminated. A portion of the reaction liquid thus obtained was taken out and was subjected to the same analyses as in Reference Example 1. These values are presented in Table 2. The subsequent operation was carried out in the same manner as in Reference Example 1, and a composition of Reference Example (styrene-isoprene-styrene block copolymer) was collected.

Reference Example 8

A composition was prepared in the same manner as in Reference Example 7, except that the amounts of styrene, n-butyllithium, TMEDA, isoprene, and methanol were respectively changed as indicated in Table 1, and thus a composition of Reference Example 8 (styrene-isoprene-styrene block copolymer) was collected. The composition of Reference Example 8 was subjected to the same analyses as in Reference Example 1. The results are presented in Table 2.

Reference Example 9

In a pressure resistant reactor, 23.3 kg of cyclohexane, 3.75 millimoles of TMEDA, and 1.80 kg of styrene were added, and while the mixture was stirred at 40° C., 250.0 millimoles of n-butyllithium was added thereto. While the temperature was elevated to 50° C., polymerization was carried out for one hour. The polymerization conversion ratio for styrene was 100%. Subsequently, while the temperature was controlled to be maintained at 50° C. to 60° C., 8.20 kg of isoprene was continuously added to the reactor for one hour. After completion of the addition of isoprene, polymerization was carried out for another one hour, and thus a styrene-isoprene diblock copolymer was formed, which would serve as the polymer C (block copolymer C1). Subsequently, 500.0 millimoles of methanol was added to the reaction liquid as a polymerization terminator. The resulting mixture was thoroughly mixed, and thereby the reaction was terminated. A portion of the reaction liquid thus obtained was taken out, and was subjected to the same analyses as in Reference Example 1. These values are presented in Table 2. The subsequent operation was carried out in the same manner as in Reference Example 1, and a composition of Reference Example 9 (styrene-isoprene diblock copolymer) was collected.

Reference Example 10

In a pressure resistant reactor, 23.3 kg of cyclohexane, 2.57 millimoles of TMEDA, and 1.10 kg of styrene were added, and while the mixture was stirred at 40° C., 85.7 millimoles of n-butyllithium was added thereto. While the temperature was elevated to 50° C., polymerization was carried out for one hour. The polymerization conversion ratio for styrene was 100%. Subsequently, while the temperature was controlled to be maintained at 50° C. to 60° C., 7.00 kg of isoprene was continuously added to the reactor for one hour. After completion of the addition of isoprene, polymerization was carried out for another one hour. Subsequently, 60.0 millimoles of methanol was added to the reactor as a polymerization terminator, and a polymerization termination reaction was carried out for one hour. The active terminal of a portion of the styrene-isoprene block copolymer having an active terminal was deactivated, and thereby a styrene-isoprene diblock copolymer which would serve as the polymer C (block copolymer C1) was formed. Thereafter, while the temperature was controlled to be maintained at 50° C. to 60° C., 1.90 kg of styrene was continuously added to the reactor for one hour. After completion of the addition of styrene, polymerization was carried out for another one hour, and thus a styrene-isoprene-styrene block copolymer was formed. The polymerization conversion ratio for styrene was 100%. Subsequently, 171.4 millimoles of methanol was added to the system as a polymerization terminator, the resulting mixture was thoroughly mixed, and the reaction was terminated. A portion of the reaction liquid thus obtained was taken out and was subjected to the same analyses as in Reference Example 1. These values are presented in Table 2. The subsequent operation was carried out in the same manner as in Reference Example 1, and a composition of Reference Example 10 was collected.

Reference Example 11 and Reference Example 12

Compositions were prepared in the same manner as in Reference Example 10, except that the amounts of styrene, n-butyllithium, TMEDA, isoprene, and methanol were respectively changed as indicated in Table 1, and thus the compositions of Reference Example 11 and Reference Example 12 were respectively collected. The compositions of Reference Example 11 and Reference Example 12 were subjected to the same analyses as in Reference Example 1. The results are presented in Table 2.

Example 1

50 Parts of the composition obtained in Reference Example 1, and 50 parts of a (styrene polymer block)-[(styrene-butadiene) random copolymer block] diblock copolymer [trade name: "Solprene 1205", manufactured by Dynasol Elastomers LLC, glass transition temperature of the (styrene-butadiene) random copolymer block −83° C., styrene unit content 25% (among the styrene units, 70% of the units are present in the styrene polymer block, and 30% of the units are present in the (styrene-butadiene) random copolymer block)] were introduced into a stirring blade type kneader. To this mixture, 150 parts of a tackifier resin (trade name: "Quintone D100", aliphatic-aromatic copolymer-based hydrocarbon resin, manufactured by Zeon corporation), 50 parts of a softening agent (trade name: "Diana Process Oil NS-90S", naphthene-based process oil, manufactured by Idemitsu Kosan Co., Ltd.), and 3 parts of an antioxidant (trade name: "Irganox 1010", manufactured by Ciba Specialty Chemicals Corp.) were added. The system was substituted with nitrogen gas, and then the mixture was kneaded for one hour at 160° C. to 180° C. Thus, an adhesive composition for labels of Examples 1 was prepared. A portion of the adhesive composition for labels thus obtained was used to measure the melt viscosity, the glass transition temperature, and the tan δ value (20° C.). Furthermore, the adhesive composition for labels thus obtained was applied on a polyester film having a thickness of 25 μM, and a sample obtained thereby was subjected to evaluations of tackiness, adhesive force, and holding power. These results are presented in Table 3.

TABLE 3

| | | Example 1 | Example 2 | Example 3 | Example 4 | Example 5 | Example 6 | Example 7 | Example 8 | Example 9 | Example 10 | Comp. Example 1 | Comp. Example 2 | Comp. Example 3 |
|---|---|---|---|---|---|---|---|---|---|---|---|---|---|---|
| Mixing Proportion [parts] | | | | | | | | | | | | | | |
| Composition | Reference Example 1 (Block copolymers A + B) | 50 | — | — | — | — | — | — | — | — | — | — | — | — |
| | Reference Example 2 (Block copolymers A + B) | — | 85 | — | — | — | — | — | — | — | — | — | — | — |
| | Reference Example 3 (Block copolymers A + B + C1) | — | — | 100 | — | — | — | — | — | — | — | — | — | — |
| | Reference Example 4 (Block copolymers A + B + C1) | — | — | — | 100 | — | — | — | — | — | — | — | — | — |

TABLE 3-continued

| | Example 1 | Example 2 | Example 3 | Example 4 | Example 5 | Example 6 | Example 7 | Example 8 | Example 9 | Example 10 | Comp. Example 1 | Comp. Example 2 | Comp. Example 3 |
|---|---|---|---|---|---|---|---|---|---|---|---|---|---|
| Reference Example 5 (Block copolymers A + B + C1) | — | — | — | — | 40 | 60 | — | — | — | — | — | — | — |
| Reference Example 6 [Polymer C) (polyisoprene)] | — | 15 | — | — | — | 10 | — | — | — | — | — | — | 10 |
| Reference Example 7 (Block copolymer B) | — | — | — | — | — | — | — | — | — | — | 60 | — | 60 |
| Reference Example 8 (Block copolymer B) | — | — | — | — | — | — | — | — | — | — | — | 70 | — |
| Reference Example 9 (Block copolymer C1) | — | — | — | — | — | — | — | — | — | — | 40 | — | — |
| Reference Example 10 (Block copolymers A + C1) | — | — | — | — | — | — | 100 | — | — | 50 | — | — | — |
| Reference Example 11 (Block copolymers A + C1) | — | — | — | — | — | — | — | 100 | — | — | — | — | — |
| Reference Example 12 (Block copolymers A + C1) | — | — | — | — | — | — | — | — | 100 | — | — | — | — |
| Solprene 1205 ™ [Polymer C (butadiene unit-containing polymer)] | 50 | — | — | — | 60 | 30 | — | — | — | 50 | — | 30 | 30 |
| Proportion of block copolymer A (%) | 30 | 29 | 30 | 23 | 15 | 22 | 41 | 44 | 49 | 21 | — | — | — |
| Proportion of polymer C (%) — Butadiene unit-containing polymer | 50 | — | — | — | 60 | 30 | — | — | — | 50 | — | 30 | 30 |
| Proportion of polymer C (%) — Block copolymer C1 | — | — | 40 | 60 | 16 | 24 | 59 | 56 | 51 | 29 | 40 | — | 10 |
| Proportion of polymer C (%) — Polyisoprene | — | 15 | — | — | — | 10 | — | — | — | — | — | — | — |
| Proportion of block copolymer B (%) | 20 | 56 | 30 | 17 | 9 | 14 | 0 | 0 | 0 | 0 | 60 | 70 | 60 |
| Total aromatic vinyl monomer unit content (%) | 25 | 26 | 30 | 30 | 31 | 32 | 30 | 25 | 30 | 28 | 34 | 20 | 34 |
| Mixing Proportion (parts) | | | | | | | | | | | | | |
| Tackifier resin | 150 | 150 | 150 | 150 | 150 | 150 | 150 | 150 | 150 | 150 | 150 | 150 | 150 |
| Softening agent | 50 | 50 | 50 | 50 | 50 | 50 | 50 | 50 | 50 | 50 | 50 | 50 | 50 |
| Antioxidant | 3 | 3 | 3 | 3 | 3 | 3 | 3 | 3 | 3 | 3 | 3 | 3 | 3 |
| Performance of adhesive composition for labels | | | | | | | | | | | | | |
| Glass transition temperature Tg (° C.) | −1.0 | −2 | 0 | −1 | −3 | −1.5 | −1.0 | −3.0 | −2.0 | −5.0 | 0 | −3.0 | 2.5 |
| Tan δ at 20° C. | 0.70 | 0.80 | 0.78 | 0.84 | 0.82 | 0.88 | 0.75 | 0.71 | 0.81 | 0.95 | 0.58 | 0.71 | 0.82 |
| Loop tack (ounce) | 35 | 32 | 45 | 43 | 48 | 45 | 55 | 57 | 49 | 53 | 40 | 28 | 35 |
| Adhesive force (N/m) | 600 | 550 | 920 | 950 | 890 | 900 | 760 | 720 | 850 | 900 | 850 | 410 | 500 |

TABLE 3-continued

|  |  | Example 1 | Example 2 | Example 3 | Example 4 | Example 5 | Example 6 | Example 7 | Example 8 | Example 9 | Example 10 | Comp. Example 1 | Comp. Example 2 | Comp. Example 3 |
|---|---|---|---|---|---|---|---|---|---|---|---|---|---|---|
| Holding power (minute) | | 450 | 720 | 520 | 320 | 270 | 480 | 450 | 400 | 280 | 270 | 150 | 600 | 120 |
| Melt viscosity (mPa·s) | 130° C. | 82000 | 52000 | 61000 | 38000 | 72000 | 59000 | 73900 | 82300 | 58500 | 61200 | 173000 | 182300 | 152000 |
|  | 150° C. | 26000 | 15000 | 16000 | 12000 | 19100 | 15800 | 29000 | 36200 | 23000 | 23000 | 42000 | 34000 | 31000 |
|  | 170° C. | 9700 | 6800 | 6900 | 5600 | 8900 | 7800 | 11000 | 13200 | 10100 | 8400 | 11500 | 8200 | 10500 |

Examples 2 to 10, Comparative Examples 1 to 3

Adhesive compositions for labels of Examples 2 to 10 and Comparative Examples 1 to 3 were prepared in the same manner as in Example 1, except that the composition and polymer used were changed as indicated in Table 3. The adhesive compositions for labels thus obtained were subjected to the same evaluations as in Example 1. The results are presented in Table 3.

From Table 3, the following was obtained. That is, the adhesive composition for labels of the present invention can be easily applied at a relatively low temperature since the composition has a low melt viscosity in a wide range of temperatures, and the adhesive composition has excellent die cutting properties since the composition has a high tan δ value at 20° C. Furthermore, the adhesive composition for labels of the present invention is also excellent in tackiness, adhesive force, and holding power (Examples 1 to 10). On the contrary, an adhesive composition for labels which does not contain the block copolymer A that is used in the present invention, has a high melt viscosity at 130° C. in particular, and therefore, the adhesive composition is not easily applied at a relatively low temperature and is poorly balanced in terms of performance such as die cutting properties or adhesiveness (Comparative Examples 1 to 3).

The invention claimed is:

1. An adhesive composition for labels comprising:
a block copolymer A represented by the following general formula (A);
a polymer C, which is a polymer having a glass transition temperature of −30° C. or lower, or a block copolymer that has a polymer block having a glass transition temperature of −30° C. or lower at an end of a polymer chain; and
a tackifier resin D;

in the general formula (A), Ar1$^a$ represents an aromatic vinyl polymer block having a weight average molecular weight of 6,000 to 20,000; Ar2$^a$ represents an aromatic vinyl polymer block having a weight average molecular weight of 22,000 to 400,000; a ratio (Mw(Ar2$^a$)/Mw(Ar1$^a$)) of the weight average molecular weight (Mw(Ar2$^a$)) of the aromatic vinyl polymer block (Ar2$^a$) and the weight average molecular weight (Mw(Ar1$^a$)) of the aromatic vinyl polymer block (Ar1$^a$) is 1.5 to 67; and D$^a$ represents a conjugated diene polymer block having a vinyl bond content of 1 mol % to 20 mol %.

2. The adhesive composition for labels according to claim 1, wherein the polymer C is a conjugated diene polymer having a glass transition temperature of −30° C. or lower, or a block copolymer that has a conjugated diene polymer block having a glass transition temperature of −30° C. or lower at an end of a polymer chain.

3. The adhesive composition for labels according to claim 2, comprising, as the polymer C, at least one kind of isoprene unit-containing polymer selected from a conjugated diene polymer containing an isoprene unit, and a block copolymer that has a conjugated diene polymer block containing an isoprene unit, at an end of a polymer chain.

4. The adhesive composition for labels according to claim 3, comprising a block copolymer C1 represented by the following general formula (C1) as the isoprene unit-containing polymer:

in the general formula (C1), Ar$^c$ represents an aromatic vinyl polymer block having a weight average molecular weight of 6,000 to 20,000; and PI represents an isoprene polymer block having a vinyl bond content of 1 mol % to 20 mol %.

5. The adhesive composition for labels according to claim 2, comprising, as the polymer C, at least one kind of butadiene unit-containing polymer selected from a conjugated diene polymer containing a 1,3-butadiene unit, and a block copolymer that has a conjugated diene polymer block containing a 1,3-butadiene unit, at an end of a polymer chain.

6. The adhesive composition for labels according to claim 2, comprising, as the polymer C, both of:
(1) at least one kind of isoprene unit-containing polymer selected from a conjugated diene polymer containing an isoprene unit, and a block copolymer that has a conjugated diene polymer block containing an isoprene unit, at an end of a polymer chain; and
(2) at least one kind of butadiene unit-containing polymer selected from a conjugated diene polymer containing a 1,3-butadiene unit, and a block copolymer that has a conjugated diene polymer block containing a 1,3-butadiene unit, at an end of a polymer chain.

7. The adhesive composition for labels according to claim 6, comprising a block copolymer C1 represented by the following general formula (C1) as the isoprene unit-containing polymer:

in the general formula (C1), Ar$^c$ represents an aromatic vinyl polymer block having a weight average molecular weight of 6,000 to 20,000; and PI represents an isoprene polymer block having a vinyl bond content of 1 mol % to 20 mol %.

8. The adhesive composition for labels according to claim 6, wherein a weight ratio of the isoprene unit-containing polymer and the butadiene unit-containing polymer is 10/90 to 90/10.

9. The adhesive composition for labels according to claim 1, wherein a weight ratio (A/C) of the block copolymer A and the polymer C is 5/95 to 95/5.

10. The adhesive composition for labels according to claim 1, further comprising a block copolymer B represented by the following general formula (B):

$$(Ar^b\text{-}D^b)_n\text{-}X \tag{B}$$

in the general formula (B), $Ar^b$ represents an aromatic vinyl polymer block having a weight average molecular weight of 6,000 to 20,000; $D^b$ represents a conjugated diene polymer block having a vinyl bond content of 1 mol % to 20 mol %; X represents a single bond or a residue of a coupling agent; and n represents an integer of 2 or greater.

11. The adhesive composition for labels according to claim 1, wherein a proportion occupied by an aromatic vinyl monomer unit relative to a total amount of polymer components consisting of the block copolymer A, a block copolymer B which is a component that is optionally contained, and the polymer C, is 13% to 80% by weight, and wherein the block copolymer B is represented by the following general formula (B):

$$(Ar^b\text{-}D^b)_n\text{-}X \tag{B}$$

in the general formula (B), $Ar^b$ represents an aromatic vinyl polymer block having a weight average molecular weight of 6,000 to 20,000; $D^b$ represents a conjugated diene polymer block having a vinyl bond content of 1 mol % to 20 mol %; X represents a single bond or a residue of a coupling agent; and n represents an integer of 2 or greater.

12. The adhesive composition for labels according to claim 10, wherein a proportion occupied by an aromatic vinyl monomer unit relative to a total amount of polymer components consisting of the block copolymer A, the block copolymer B, and the polymer C, is 13% to 80% by weight.

13. The adhesive composition for labels according to claim 1, wherein a content of the tackifier resin D relative to 100 parts by weight of polymer components consisting of the block copolymer A, a block copolymer B which is a component that is optionally contained, and the polymer C, is 10 to 500 parts by weight, and wherein the block copolymer B is represented by the following general formula (B):

$$(Ar^b\text{-}D^b)_n\text{-}X \tag{B}$$

in the general formula (B), $Ar^b$ represents an aromatic vinyl polymer block having a weight average molecular weight of 6,000 to 20,000; $D^b$ represents a conjugated diene polymer block having a vinyl bond content of 1 mol % to 20 mol %; X represents a single bond or a residue of a coupling agent; and n represents an integer of 2 or greater.

14. The adhesive composition for labels according to claim 10, wherein a content of the tackifier resin D relative to 100 parts by weight of polymer components consisting of the block copolymer A, the block copolymer B, and the polymer C, is 10 to 500 parts by weight.

15. The adhesive composition for labels according to claim 1, further comprising a softening agent.

16. The adhesive composition for labels according to claim 10, further comprising a softening agent.

* * * * *